United States Patent [19]

Andrea et al.

[11] Patent Number: 5,251,263
[45] Date of Patent: Oct. 5, 1993

[54] ADAPTIVE NOISE CANCELLATION AND SPEECH ENHANCEMENT SYSTEM AND APPARATUS THEREFOR

[75] Inventors: Douglas Andrea, Old Brookville; John Kowalski, Greenlawn, both of N.Y.

[73] Assignee: Andrea Electronics Corporation, Long Island City, N.Y.

[21] Appl. No.: 887,500

[22] Filed: May 22, 1992

[51] Int. Cl.⁵ .................................. G10K 11/16
[52] U.S. Cl. ................................ 381/71; 381/94; 381/72
[58] Field of Search ............... 381/71, 72, 94, 74; 379/430

[56] References Cited

U.S. PATENT DOCUMENTS

| | | |
|---|---|---|
| 3,702,644 | 11/1972 | Fowler . |
| 4,025,734 | 5/1977 | Aloupis ........................ 381/151 |
| 4,241,805 | 12/1980 | Chance . |
| 4,261,708 | 4/1981 | Gallagher . |
| 4,494,074 | 1/1985 | Bose . |
| 4,539,708 | 9/1985 | Norris . |
| 4,630,304 | 12/1986 | Borth . |
| 4,649,505 | 3/1987 | Zinser . |
| 4,654,871 | 3/1987 | Chaplin et al. ................. 381/72 |
| 4,736,432 | 4/1988 | Cantrell . |
| 4,862,506 | 8/1989 | Landgarten . |
| 4,878,188 | 10/1989 | Ziegler . |
| 4,887,229 | 12/1989 | Weiss . |
| 4,930,156 | 5/1990 | Norris . |
| 4,947,356 | 8/1990 | Elliott . |
| 4,953,217 | 8/1990 | Twiney et al. ................. 381/72 |
| 4,959,865 | 9/1990 | Stettiner . |
| 4,977,600 | 12/1990 | Ziegler . |
| 4,985,925 | 1/1991 | Langberg . |
| 5,010,576 | 4/1991 | Hill . |
| 5,018,202 | 5/1991 | Takahashi . |
| 5,029,218 | 7/1991 | Nagayasu . |
| 5,033,082 | 7/1991 | Eriksson et al. ............... 381/94 |
| 5,052,510 | 10/1991 | Gossman . |
| 5,091,954 | 2/1992 | Sasaki . |
| 5,113,428 | 5/1992 | Fitzgerald ................... 379/430 |
| 5,117,461 | 5/1992 | Moseley ........................ 381/72 |
| 5,125,032 | 6/1992 | Meister et al. ............... 381/151 |
| 5,134,659 | 7/1992 | Moseley ........................ 381/72 |
| 5,138,664 | 8/1992 | Kimura et al. ................. 381/72 |
| 5,182,774 | 1/1993 | Bourk ......................... 379/430 |

FOREIGN PATENT DOCUMENTS

2172769 9/1986 United Kingdom ................. 381/72

OTHER PUBLICATIONS

B. Widrow et al., "Adaptive Noise Cancelling: Principles and Applications", Proc. IEEE, vol. 63, pp. 1692-1716, Dec. 1975.
B. Widrow et al., "Adaptive Antenna Systems", Proc. IEEE, vol. 55, No. 12, Dec. 1967.
M. Sambur, "Adaptive Noise Cancelling for Speech Signals", IEEE Trans. Acoust. Speech, and Sig. Proc., vol. ASSP-26, No. 5, Oct. 1978.
K. Ogata, Modern Control Engineering, Ch. 10, Design and Compensation Techniques, pp. 474-508, Prentice Hall, 1968.
B. Kuo, Automatic Control Systems, Ch. 10, Introduction to Control Systems Designs, pp. 504-510, Ch. 11, Introduction to Optimal Control, pp. 574-585, Prentice Hall, 1965.

(List continued on next page.)

C. Beranek, Acoustics Ch. 5, Acoustic Components, pp. 116-126, Ch. 6 Pressure Microphone, pp. 157-164, Ch. 7, Direct-Radiatior Loudspeakers, pp. 183-193, American Institute of Physic's, 1986.

*Primary Examiner*—Forester W. Isen
*Attorney, Agent, or Firm*—Frishauf, Holtz, Goodman & Woodward

[57] ABSTRACT

Disclosed is a headset apparatus for use in an intercommunications system, the headset suppressing both noise in the vicinity of a transducer delivering sound to an operator's ear and in outgoing speech from the operator.

19 Claims, 16 Drawing Sheets

OTHER PUBLICATIONS

A. Papoulis, Probability, Random Variables and Stochastic Processes, Ch. 13-7, Adaptive Noise Filters, pp. 467-474, 2nd Ed. McGraw Hill, 1985.

D. Luenberger, Optimization by Vector Space Methods, Ch. 5, Dual Spaces, pp. 134-138, McGraw Hill, 1969.

S. Boll, "Suprresion of Acoustic Noise in Speech using Spectral Subtraction", IEEE Trans. On Accoustics, Speech, and Signal Processing, vol. ASSP-27, pp. 113-120, Apr. 1979.

D. Youla et al., "Image Restoration by the Method of Convex Projections: Part 1-Theory", IEEE Trans. On Medical Imaging, vol. MI-1 No. 2, pp. 81 Oct. 1982.

White, "Considerations in High-fidelity Moving-Coil Earphone Design", pp. 188-194, IEEE Transactions On Audio, pp. 188-194, Nov.-Dec. 1963.

L. Rabiner & R. Schafer, Digital Processing of Speech Signals, pp. 130-135, Prentice Hall, 1978.

L. Rabiner et al., "A Comparative Performance Study of Several Pitch Detection Algorithms", IEEE Transactions On Acoustics, vol. ASSP-24, vol. No. 5, pp. 399-, Oct. 1976.

ADAPTIVE NOISE CANCELLATION AND SPEECH ENHANCEMENT SYSTEM AND APPARATUS THEREFOR

FIELD OF THE INVENTION

The present invention relates to a noise cancellation system and apparatus therefor and, more particularly, to a system and apparatus for improving the quality, intelligibility and reliability of speech and data input into intercommunications systems and intercepts in noisy environments.

BACKGROUND OF THE INVENTION

Typically, noise cancellation systems enhance the quality of speech in an environment having a relatively high level of ambient background noise (a noisy environment). A number of systems attempt to estimate background noise so that it can be subtracted from a signal.

Acoustic noise suppression has been implemented in a wide variety of settings such as basic hearing aids (see, e.g., Langberg); cooling fans, e.g., those found in computers (see Hill); driving devices in a chamber, for instance, a compressor (see Nagayasu); propeller driven aircraft (see Elliot); vehicle seats (see Ziegler '600); and voice transmission in an emergency vehicle (see Cantrell). Dual-input adaptive cancelers are known in the communications areas (see, e.g., Widrow. 1975). Widrow (1975) particularly illustrates the use of least mean square (LMS) gradient control algorithms in such apparatus (see also Zinser and Zeiqler). These publications are cited at the end of this specification.

Although these publications describe numerous acoustic noise suppression techniques, they fail to provide an acoustic noise suppression technique as set forth in the present invention. For example, in Borth, a noise estimation means generates and stores an estimate of background noise based upon a pre-processed input signal; a noise detection means performs speech/noise decision based upon a post-processed signal; and the noise detection means provides the speech/noise decision to noise estimation means so that the background noise estimate is updated only when the detected minima of post-processed signal energy is below a predetermined minima. A key difference between the present invention and Borth is that the present invention employs an improved speech detection means utilizing delays so as to minimize any possibility of lost unvoiced consonants, preferably by use of an adaptive non-parametric detector statistic based upon a Kolmogorov-Smirnov Test, to more evenly discriminate speech from a given user from background noise consisting of several voices.

Langberg relates to an electronic earplug seated in the concha fossa (the hollow external portion adjacent to the opening of the ear canal), which acts as a passive acoustical barrier. The earplug contains a summing microphone which detects noise which has penetrated the occluded ear canal and the output signal from the summing microphone is used to initiate active noise reduction. Langberg does not appear to teach or suggest an in-ear or in-earpiece microphone for detecting speech, nor does Langberg describe or the headset of the present invention.

More specifically, Langberg does not appear to teach or suggest compensation for use in the ear. Langberg also does not appear to teach or suggest filtering to account for density changes in the ear which may otherwise lead to ear canal/middle ear impedance mismatching or instabilities at certain frequencies.

Further, an embodiment of the present invention utilizes an "in-ear" microphone to transmit speech when a push-to-talk or voice-operated-switch (VOX) switch is depressed or activated. The embodiments of the present invention also utilize a "reference sensor" located in an external portion of the "earplug", which is acoustically isolated from the earplug, to measure background noise. Another embodiment of the present invention employs an adaptive filter means, e.g., using a least mean square (LMS) algorithm, to account for variations in the feedback path. These features do not appear to be taught or suggested by Langberg.

Zeigler '188 relates to canceling only harmonic disturbances. Unlike Zeigler, in the present invention, any type of random or harmonic disturbances may be canceled. Further, in the present invention, there are compensators for feedback and reference paths to ensure that the channels are matched in both amplitude and phase over a specified band; this is done non-adaptively. Furthermore, the present invention also provides filtering compensation to achieve broadband as well as narrow band cancellation.

Nagayasu merely eliminates noise without any apparent teaching or suggestion to enhance speech. Landgarten merely relates to monitoring, testing and controlling vibration. Sasaki does not appear to teach or suggest employing an adaptive system that automatically compensates for changes in feedback as in the present invention. For instance, the present invention may use filtering to compensate for the speaker/ear canal transfer function (to match reference and feedback channels). This filtering does not non-adaptively couple the reference and feedback signals. In the present invention, filtering is used to minimize signal decorrelation effects so as to extend the ability of the adaptive processor to cancel noise when the noise statistics and feedback path change.

Stettiner is akin to Borth and likewise fails to teach or suggest a VOX switch with a push-to-talk option for determining speech from noise. In the present invention which is a voice detection means (algorithm) is streamlined and robustized by using inter alia, a nonparametric test such as a Kolmogorov-Smirnov Test. Cantrell addresses the dominant harmonic by essentially using a phase locked loop approach to control a notched filter. While the present invention focuses on speech enhancement, by the use of adaptive filters, the present invention is able to work with a wider variety of modulated signals, as well as with several given signals at a time. Elliot relates to zonal quieting to control the phase of a propeller or fan and does not appear to relate to speech enhancement. Likewise, Hill is concerned with reducing noise in rotating equipment, such as, a fan, and does not appear to relate to speech enhancement as in the present invention. Zinser merely provides a variation on the LMS algorithm.

Thus, the prior art fails to provide a noise cancellation and speech enhancement system and apparatus as described in the present invention. More specifically, the prior art fails to provide a noise cancellation system including a spectral subtractor and a push-to-talk or VOX switch which enables a speech/noise determination by use of test statistics including, for example, sample zero crossings, changes in the number of tonals, energy and a nonparametric test such as a Kolmogorov-Smirnov Test. Further, utilizing a spectral algorithm with a LMS algorithm in a noise cancellation and speech enhancement system and apparatus, as in the present invention, has not been taught or suggested. Furthermore, a noise cancellation system wherein the spectral algorithm not only employs the above-described test statistics, but also includes a constraint function for minimizing residual musical noise, as well as a tracking device to identify tonal noise components and predict trajectories thereof, as in the present invention, has not been taught or suggested. Further, the in-ear and in headset (or handset, e.g., for telephones) devices of the present invention which utilize the previously mentioned features have not been heretofore taught or suggested.

While all of the above-described prior art systems relate to acoustic noise cancellation, they are limited by the lack of performance in severe noise environments; namely, they fail to perform in severe noise environments wherein the noise is highly impulsive or poorly defined.

OBJECTS AND SUMMARY OF THE INVENTION

It is an object of the present invention to provide an adaptive noise cancellation and speech enhancement system and apparatus which avoids the foregoing problems associated with the prior art.

More specifically, it is an object of the present invention to provide an adaptive noise cancellation and speech enhancement system and apparatus for enabling a more acceptable detection of speech from a signal having a speech signal in the environment of a relatively high level of noise.

It is another object of the present invention to provide an adaptive noise cancellation and speech enhancement system and apparatus for improving the quality of the output speech obtained from subtracting noise from a signal having a speech signal and noise.

It is a further object of the present invention to provide an adaptive noise cancellation and speech enhancement system and apparatus for improving the quality and intelligibility of speech input into intercommunications systems in noisy environments, e.g., automobiles, boats, trucks, work places (such as construction, manufacturing, stock or commodities trading, and the like) and public places (such as bars, taverns, restaurants, and the like) and, particularly, for aircraft and military environments.

It is yet another object of the present invention to provide an adaptive noise cancellation and speech enhancement system and apparatus which can be applied to an existing intercom, radio, acoustic intercept or communications systems, so as to require relatively little or no modifications to the existing system.

It is still another object of the present invention to provide an adaptive noise cancellation and speech enhancement system and apparatus which can be employed in various applications, including, without limitation, telephone and telecommunications applications and adaptive microphone applications.

In accordance with an aspect of this invention, headset apparatus is provided which comprises at least one housing each having first microphone means for receiving a reference signal, second microphone means for receiving a signal from within the respective housing and speaker means for providing an acoustic signal to the operator, and means coupled to each of the housings for holding the housing over a respective ear of the operator.

In accordance with another aspect of this invention, headset apparatus is provided which comprises a housing having speaker means for providing an acoustic signal to an operator using the headset, first microphone means for receiving the signal from the operator, second microphone means for receiving a reference signal, third microphone means for receiving the acoustic signal, delay means for delaying the signal from the operator so as to form a delayed signal, and means for receiving an input signal and for combining the same with the delayed signal for supplying to the speaker means.

In accordance with still another aspect of this invention, a system is provided for communicating between two or more operators which comprises headset means including at least one housing each having first microphone means for receiving a reference signal, second microphone means for receiving an internal signal from within the respective housing and speaker means for providing an input signal to the respective operator using the headset means; first processing means for respectively processing each of the reference signals received from the respective first microphone means so as to form a first processed signal; and means for combining the respective processed reference signal and a signal from another of the operators so as to form the input signal.

In accordance with still a further aspect of this invention, a system is provided for communicating between two or more operators which comprises headset means including a housing having speaker means for providing an acoustic signal to the operator using the headset means, first microphone means for receiving a signal from the operator using the headset means, second microphone means for receiving an external reference signal, third microphone means for receiving the acoustic signal, and means for receiving an input signal from another of the operators and combining the same with the signal from the operator for supply to the speaker means; first processing means receiving respective output signals from the first, second and third microphone means for processing the same in accordance with a first predetermined processing so as to obtain a first processed signal; and second processing means for processing the first processed signal in accordance with the second predetermined processing so as to obtain a second processed signal for supply to the other operator.

Other objects, features and advantages of the present invention will become apparent from the following detailed description of the illustrated embodiments when read in conjunction with the accompanied drawings in which corresponding components are identified by the same reference numerals.

DETAILED DESCRIPTION OF THE PREFERRED EMBODIMENTS

The adaptive noise cancellation (ANC) and speech enhancement system and apparatus of the present invention provide acoustical and electrical "in wire" speech enhancement for intercom, telephone, and radio application and the like in a compact, reliable lightweight low power consumption unit.

The system uses advanced digital signal processing technology to implement adaptive noise canceling and a digital voice operated switch (VOX).

The system includes an adaptive noise canceling headset, adaptive processor, and an analog-to-digital (A/D) and digital-to-analog (D/A) conversation interface. The headset includes a reference microphone, feedback microphone, speaker, housing (e.g., a plastic housing) and wires coupled to the processor. The A/D interface converts the voltage levels and impedances from those of the microphone to those required by an A/D chip for optimal (minimum mean square error) quantization. A/D and D/A conversion is accomplished by use of any suitable chip or chips, preferably two Texas Instruments TLC32046 A/D/D/A chips.

The digital outputs of the A/D and D/A chips are fed to a serial port on a digital processor, which is preferably a Motorola DSP56001. The DSP56001 processor performs all digital signal processing functions, and supplies the outputs to the above-mentioned interface chips. The output signals are (1) used to drive the speaker for acoustic, e.g., in-ear cancellation and (2) an output speech enhanced signal that is used for intercom and voice radio transmission. This signal optionally can be encoded to easily interface with digital radios. That is, the processor can provide speech that is continuously variable slope delta (CVSD) modulated or adaptive predictive coded (APC) or otherwise encoded or encrypted.

The system provides the capability to cancel one channel acoustically and to provide one channel of "in wire" enhanced speech. The system also has the capability to be adapted for growth to two acoustic channels and one channel of in wire cancellation by use of an additional ANC unit, designated as an expansion unit in the following discussion. The expansion unit contains the additional A/D/D/A's conversion and processing. The system of the invention can also be further expanded, for instance to four channels, as discussed below.

The system is preferably battery operated with DC to DC conversion circuitry to enable the system to be used in a variety of environments.

The system provides at least 10 dB signal to noise ratio improvement at a +3 dB signal to noise ratio (or less) over a 60 dB dynamic range. This number is measurable by using colored Gaussian noise in a 0 to 4 kHz band and using additive speech.

Figure 11:
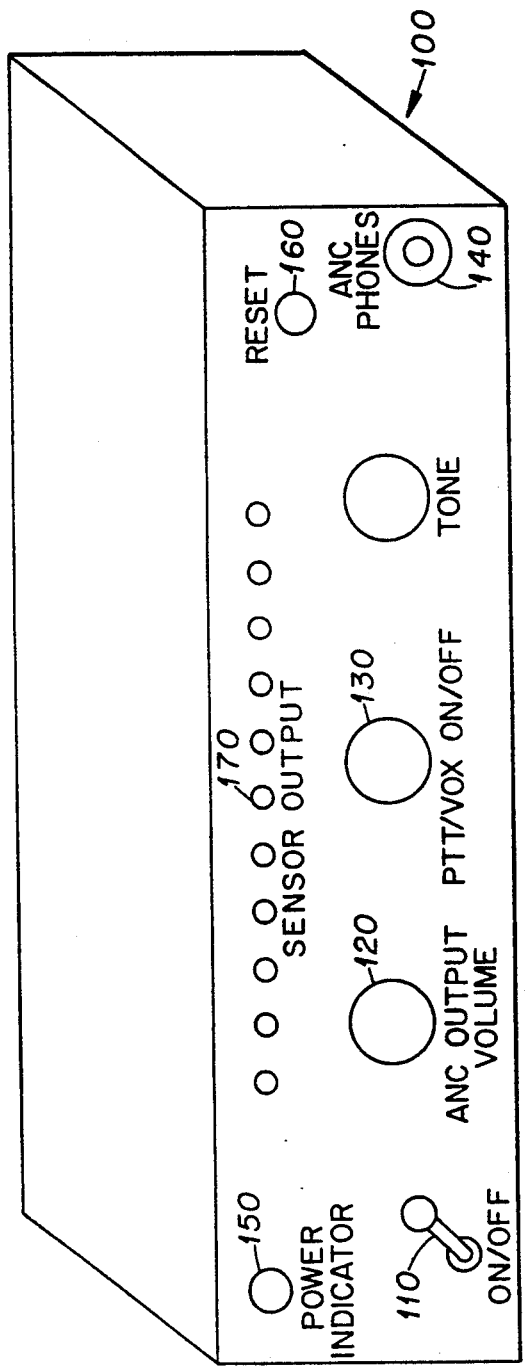
FIG. 11 illustrates an ANC unit according to an embodiment of the invention.

All basic system circuitry including the analog and digital signal processing circuitry is preferably contained on one or more relatively small PC boards. As a result, a processor 100, as shown in FIG. 11, has a volume of approximately 20 cubic inches. The basic processor unit 100 will be hereinafter referred to as the ANC unit.

With one channel of acoustic cancellation being performed using the basic unit, the headset has one ear with acoustically damping padding. When the basic ANC unit is employed with an Expansion Unit, a two-channel headset provides acoustic cancellation in each ear. The ANC unit may also contain a larger number of channels, for example, 4 channels, which may be configured so as to lie on a single board. (This unit is hereinafter referred to as "Four Channel Unit").

The system controls of the ANC unit 100 (FIG. 11) include an ON/OFF switch 110, an ANC output volume control 120, a VOX threshold control and a push-to-talk (PTT) switch 130. The headset plugs into the ANC processor unit at an interface 140. The ANC processor unit 100 also contains jacks for interfacing with intercoms and radios and for expansion to four channels using the Expansion Unit. The ANC unit 100 may also have a power indicator 150, a reset 160, and a sensor output 170.

Figure 4:
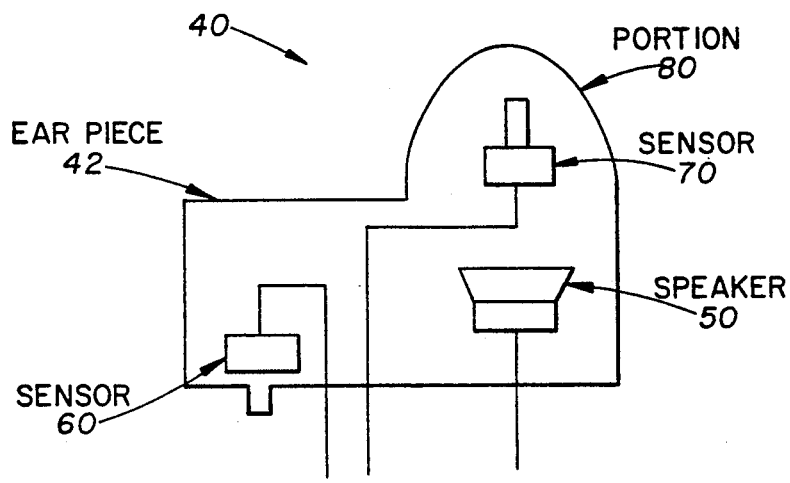
FIG. 4 illustrates an in-ear headset according to an embodiment of the invention.
Figure 5:
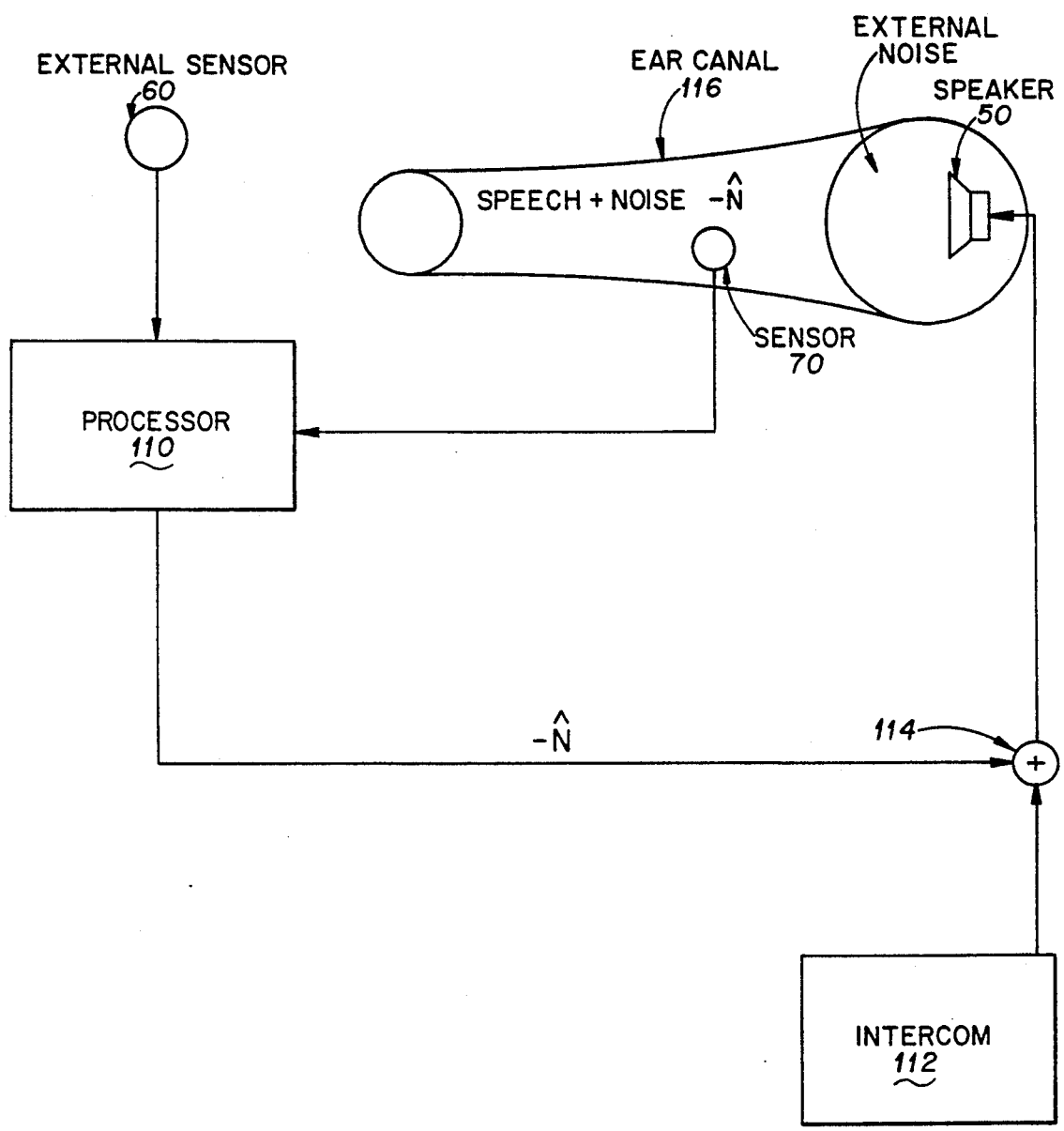
FIG. 5 illustrates a receive mode of the system according to an embodiment of the invention.
Figure 6:
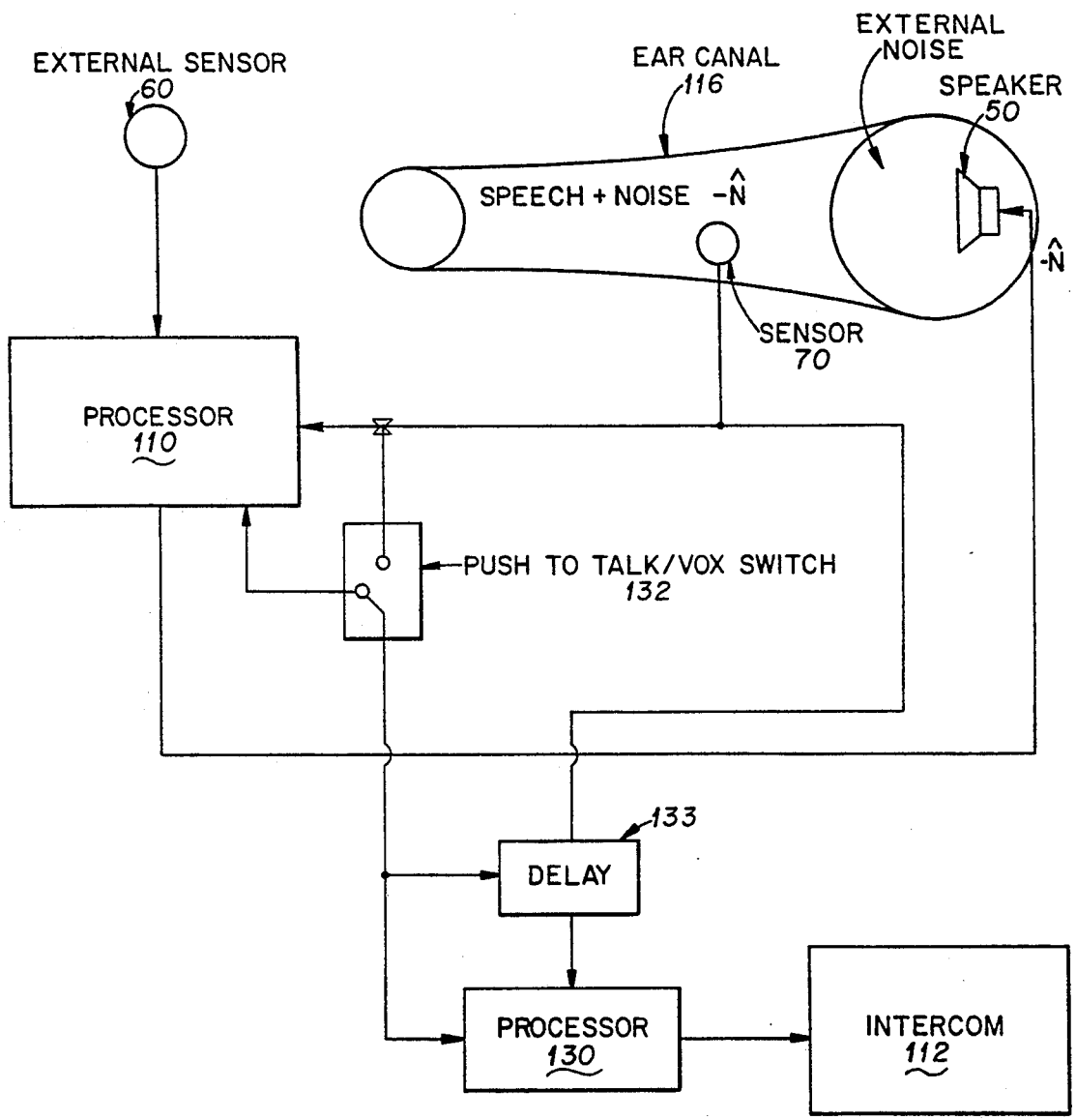
FIG. 6 illustrates a transmit mode of the system according to an embodiment of the invention.
Figure 8:
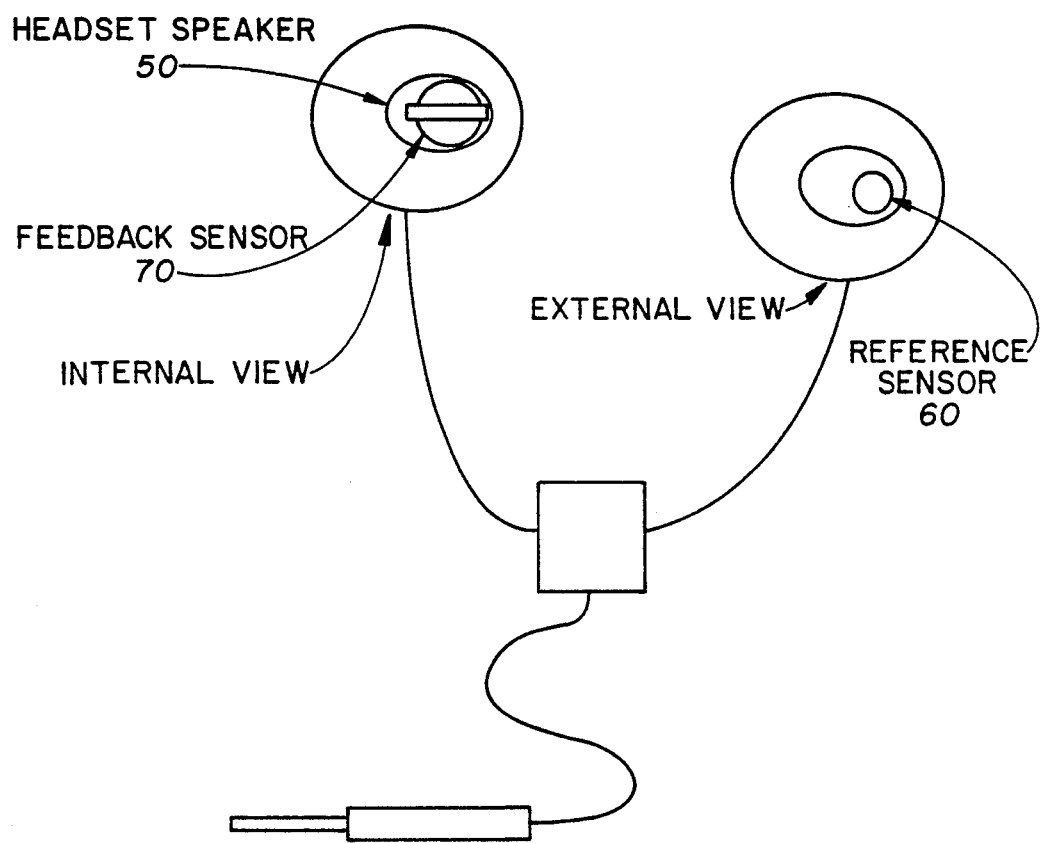
FIG. 8 illustrates a headset unit according to an embodiment of the invention.

An in-ear headset unit 40, and its operation in conjunction with the system are generally shown in FIGS. 4, 5, and 6.

The in-ear headset 40 (FIG. 4) generally includes a speaker 50, a reference sensor or microphone 60 which is adapted to detect external background signals, and a feedback/voice transmission sensor or microphone 70 which are mounted in a single ear piece 42. A portion 80 of the in-ear headset 40 is located closest to or in the ear canal opening of the operator using the headset 40. As is to be appreciated, the respective positions of the speaker 50 and sensors 60 and 70 relative to the portion 80 may vary. For the operator's other ear, a conventional passive attenuator headset (not shown) can be employed to reduce the noise. As a result, an enhanced performance headset, that is, a headset which includes the in-ear headset 40 and the conventional passive attenuator headset, provides active adaptive speech enhancement in both ears. This headset is preferably used when the Expansion Unit or multiple channel unit is present.

The microphones or sensors preferably provide linearity up to approximately 125 dB spl, and each has a dynamic range of at least 75 dB. The distortion of the microphone is preferably less than 0.5% total harmonic distortion (THD). The total group delay for the microphone is preferably less than 25 microseconds (1/40 kHz).

The speaker 70 in the headset 40 and in the passive attenuator headset (not shown) are preferably those typically used in portable, lightweight, in-ear headsets. These speaker(s) preferably have a THD less than 1% and generate 125 dB spl at a distance of approximately 0.5 inches away from the speaker. The speaker(s) preferably have a group delay <25 microseconds.

FIGS. 5 and 6 illustrate the operation of the headset 40 in the receive and transmit modes, respectively. More specifically, in the receive mode, as shown in FIG. 5, external background or reference acoustic sounds (which may be referred to as noise), for example, sirens, engine noises and crowd noises, are picked-up by the sensor 60 and supplied to a processor 110 along with a feedback or error signal from the sensor 70. The processor 110 processes the received signal in accordance with a predetermined algorithm, which is preferably an LMS type algorithm. That is, the LMS processor 110 supplies the reference signals through a tap delay finite impulse response (FIR) filter, in which the coefficients of the filter (filter taps) are controlled by correlating the feedback signal with the respective signal at each tap. The output of the processor 10, which represents antinoise, is supplied to a combining circuit 114 along with a signal from an intercom 112. The combined signal from the combining circuit 114 is supplied to the speaker 50, contained within the headset 40 which is located in the ear canal 116 of the operator, so as to be heard by the operator.

In the receive mode (FIG. 5), the LMS algorithm alone is used to cancel the ambient noise. The headphone speaker transduces the summed antinoise and intercom output.

In the transmit mode, as shown in FIG. 6, background or reference noise is pick-up by the sensor 60 and supplied along with the error signal from the sensor 70 to the processor 110 so as to output an anti-noise signal for supply to the speaker 50, as hereinbefore described with reference to FIG. 5. When the operator wearing the headset 40 wishes to speak with another person via the present system, the operator speaks aloud so as to form a signal which is translated through the operator's eustachian tube (which extends approximately from the back portion of the throat to the middle ear portion of the ear) to the inside of the ear. As a result, this signal is detected by the sensor 70 and thereafter supplied to a processor 130 through a delay circuit 133 which imposes a predetermined delay so as to capture speech onsets and a switch 132, which may be either a push-to-talk switch or a VOX switch. If the push-to-talk switch is being utilized, then when the operator wishes to talk to the other person(s), the operator merely activates the switch 132 so as to supply the signal from the sensor to the processor 130. If, on the other hand, the VOX switch is used, a VOX algorithm, as hereinafter more fully described, determines that the signal from the sensor 70 is activating a speech or voice signal from the operator and not just an error or feedback signal whereupon the VOX switch enables the voice signal to be transmitted to the processor 130. The processor 130 processes the received signals in accordance with a predetermined algorithm, such as a spectral subtraction algorithm as hereinafter more fully described. The processed signal from the processor 130 is thereafter supplied to the intercom 112 so as to be heard by the other person. Further, upon activating the switch 132, the signal from the sensor 70 is not supplied to the processor 110, since this signal is currently a voice signal and not an error signal.

In the transmit mode (FIG. 6), the headset speaker 50 is used to play the antinoise output from the Least Mean Square (LMS) algorithm of the Adaptive Processor 110. The error signal is produced by the spatial summation of the speech, the estimated antinoise, and the ambient acoustic noise. This error signal is correlated with an externally received reference signal from the sensor 60 to derive the optimum Finite Impulse Response (FIR) filter parameters, using the below equations:

$$Z_n = W_n^T X_n \qquad (A)$$

$$X_n = (X_n, X_{n-1}, \ldots X_{n-N})^T \qquad (B)$$

$$W_n = (W_0 W_1, \ldots W_N)^T \qquad (C)$$

$$W_n = (1-a)W_{n-1} + Ga\epsilon_n X_n \qquad (D)$$

The inputs to the LMS algorithm are compensated in software to account for the transfer function of the speaker element.

The error signal is also sent to the spectral subtraction processor 30. When no speech is transmitted as determined by the Push-To-Talk (PTT) or Voice Operated (VOX) switch 132, the spectral subtraction processor updates the noise spectrum estimate. However, when the PTT is depressed, or when the VOX detects a speech signal, the spectral subtraction processor disables the noise spectrum updating, and uses the noise spectrum to subtract from the speech plus noise spectrum.

The spectral subtraction algorithm or processor 130 is able to remove residual broadband components present in the signal to be transmitted which the LMS algorithm cannot, because the LMS algorithm's residual noise signal is approximately uncorrelated with the reference data in steady state.

Figure 13:
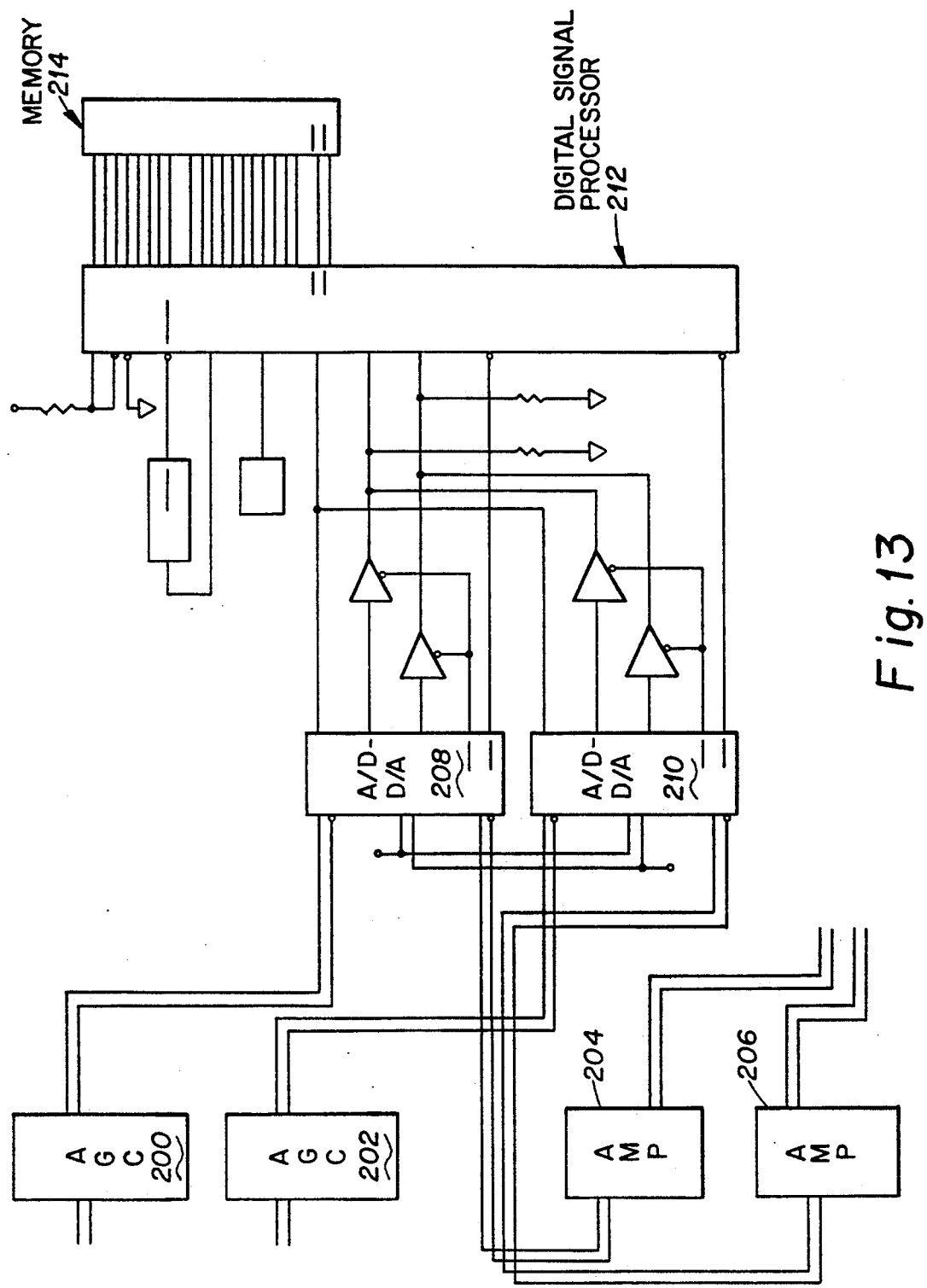
FIG. 13 illustrates a schematic diagram for incorporating the algorithms.
Figure 14:
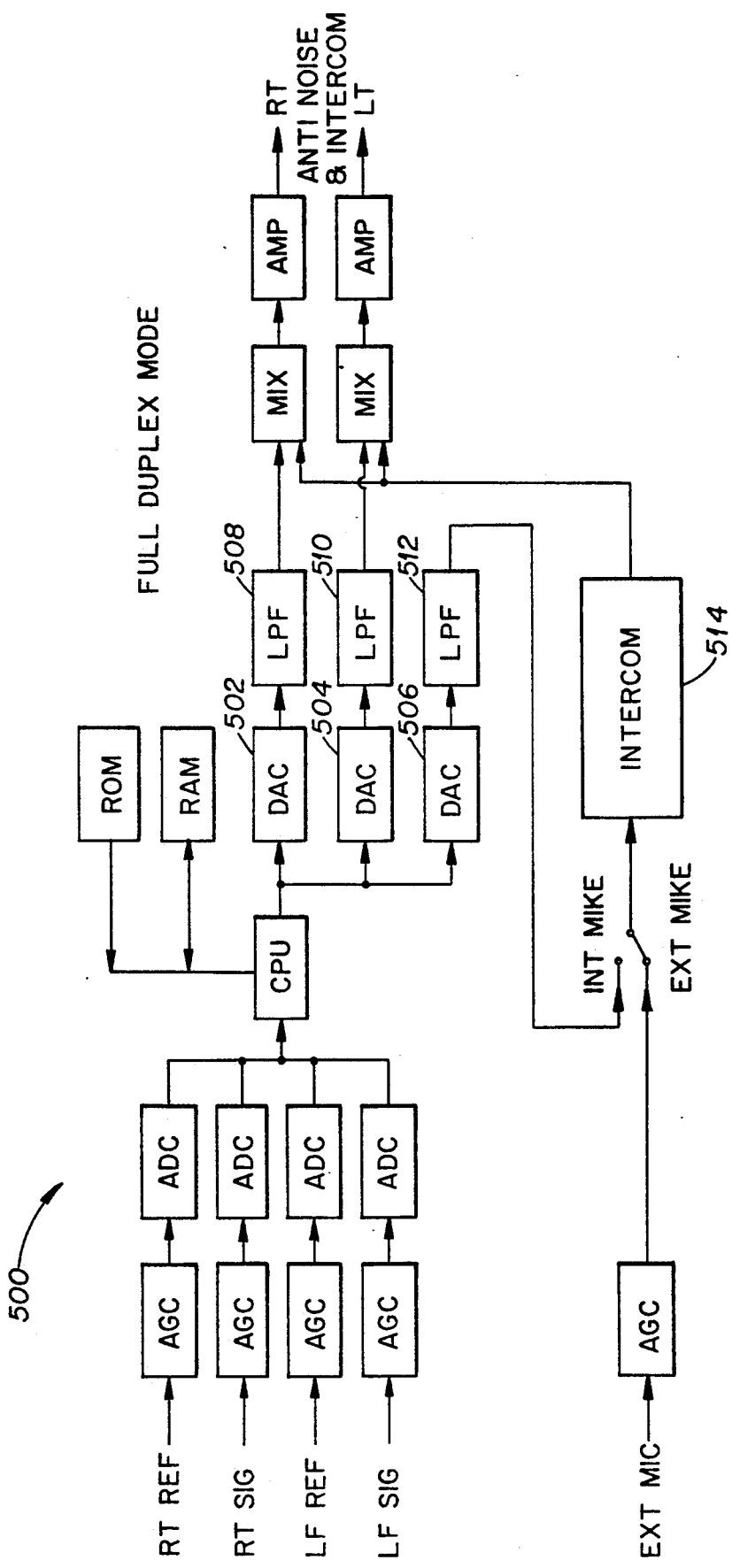
FIG. 14 illustrates the schematic diagram of a multiple channel embodiment of the processor of FIG. 13 in block form.

The signal processing for the present system is preferably performed in circuits contained within the processor unit 100 (FIG. 11). An example of such circuits is illustrated in FIGS. 13 and 14. More specifically, as shown in FIG. 13, input analog signals are respectively received and supplied through automatic gain control (AGC) circuits 200 and 202 to A/D-D/A converters 208 and 210, acting herein as analog interface chips, so as to be converted into digital form. The digital output signals therefrom are supplied to a digital signal processor 212 which receives the algorithm from a memory device 214, for example, a ROM, during initialization of the system. The processor 212 preforms the processing in accordance with the stored algorithms and respectively supplies processed output digital signals through A/D-D/A converters 208 and 210, so as to be converted into analog form, to amplifiers 204 and 206 so as to be amplified and supplied therefrom.

In the preferred embodiment, the circuits as shown in FIG. 13 are utilized. That is, in one circuit, the VOX and the LMS algorithms are stored in the memory 214, and, in the second circuit, the spectral subtraction algorithm is stored therein.

The components without reference numeral designations will not be specifically discussed, since these connections are readily apparent to those skilled in the art.

FIG. 14 illustrates a multiple channel adaptive noise cancellation unit 500 which is substantially similar to that previously in reference to FIG. 13. However, the unit 500 is capable of providing acoustic cancellation in two ears and in-wire cancellation, as hereafter described. Further, in multiple adaptive noise cancellation unit 500 there are three digital-to-analog converters 502, 504 and 506 and low-pass filters 508, 510 and 512 so as to provide the necessary signals for each ear and an intercom 514 connected thereto. Further description of unit 500 will not be presented herein as it is otherwise substantially similar to the circuit of FIG. 13.

The outputs from the processor are converted to analog, and sent to the intercom. Depending on whether the intercom operates in half or full duplex mode there are two or three outputs from the processor which are output time division multiplexed.

The system uses a relatively low amount of power, that is, approximately 5 watts or less.

The ANC unit 100 cancels noise without distorting speech in a predetermined frequency bandwidth, which is preferably 0 to 4 kHz. This bandwidth is maintained from the sensor inputs to the A/D chips. The signal levels at the microphone outputs are preferably in the range of 5–20 mV rms. The analog interface circuitry preferably provides gain sufficient to be within the limiting region of the A/D 99.9% of the time when Gaussian noise is digitized. That is, the levels are set in such a way as when a Gaussian signal with average power given by the average power rating for the microphone is used, the gain is such that clipping occurs 0.1% of the time. The signals in the reference and feedback preferably track each other to within 1 dB in amplitude and within 0.5 degree of phase over the zero to 4 kHz band.

The ANC analog interface circuitry preferably provides outputs compatible with standard intercoms and radios. Optionally, the ANC can provide a digital interface to be used for digital radio communication.

Each automatic gain control (AGC) device preferably provides a dynamic range of 70 dB. The attack time and decay times, defined as the settling times for the AGC, are preferably 1.5 ms and 125 ms, respectively. Each AGC provides exponential gain control by feeding back the magnitude or magnitude squared of the input signal, subtracting a bias and low pass filtering the result. This signal is then supplied to an attenuator included in the AGC's 200 and 202 (FIG. 13).

As stated earlier, the analog and data conversion hardware are expandable through the use of an optional expansion unit. The analog interface circuitry provides a low impedance output (approximately 8 Ohms) with variable levels to provide a match for levels to most intercom and radio interfaces.

The digital signal processing for two channels is performed by any suitable processor, for example, a Motorola DSP 56001 programmable digital signal processor, which receives input data from two suitable analog interface circuits, for example, two Texas Instruments analog interface circuits (AIC) TLC32046. The system provides an expansion port that allows multiple numbers of processor boards or systems to be linked together. This building block feature enables the construction of multichannel multiprocessor adaptive systems. In addition, there is a system ROM, glue logic, and clock circuitry. The Four Channel Unit uses four AIC type chips and one DSP56001 type processor.

The system software is preferably contained in a 2716 2K×8 ROM. When the system is powered up and a reset is executed, the system software will be loaded into the processors' internal RAM The loading sequence is immediately followed by the execution of system software.

The system software preferably includes suitable internal house keeping programs that provide functions such as operator switch controls, switch debounce, system interface configurations, and system initializations. The system preferably provides a watch-dog feature that detects a processor crash such as those typically caused by power supply interruptions. Upon the detection of a processor crash, the watch-dog circuit resets the system and resumes operation without operator intervention. The interface for multiple processors can be any suitable interface to appropriately link the multiple processor.

The software is implemented using any suitable digital signal processor that preferably has at least 512 words of separate program and data memory, such as the Motorola DSP56001 digital signal processor. That is, the DSP56001 processor has three types of internal memory: program memory, X data memory, and Y data memory. The internal program memory may contain 512 words, and each of the internal X and Y memories may contain 256 words, wherein each word has 24 bits.

The present invention cancels noise and enhances speech by utilizing a program which uses approximately 1K of program memory and 2K of each of the X and Y data memories. External memory can be added to the DSP56001 to provide additional memory which may be desired. Three 32K×8 EPROMs may be used to expand the program memory of the DSP56001 in the preferred embodiment from 512 words to 32K. Similarly, two 8K×24 RAM may be used to expand the X and Y memories from 256 words each to 8K words.

Figure 12A:
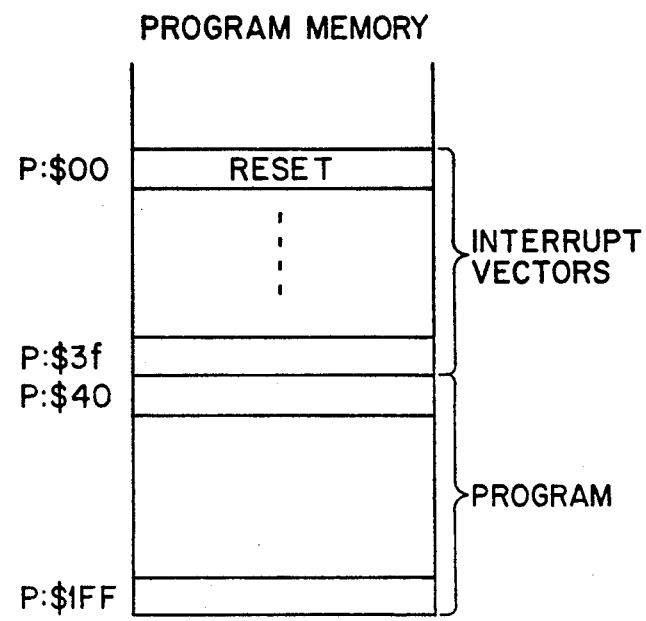
FIGS. 12A, 12B an 12C illustrates a memory map.
Figure 12B:
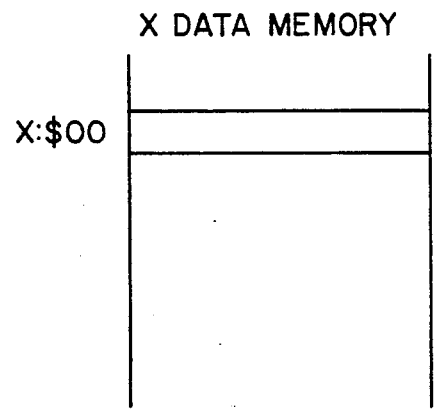
Figure 12C:
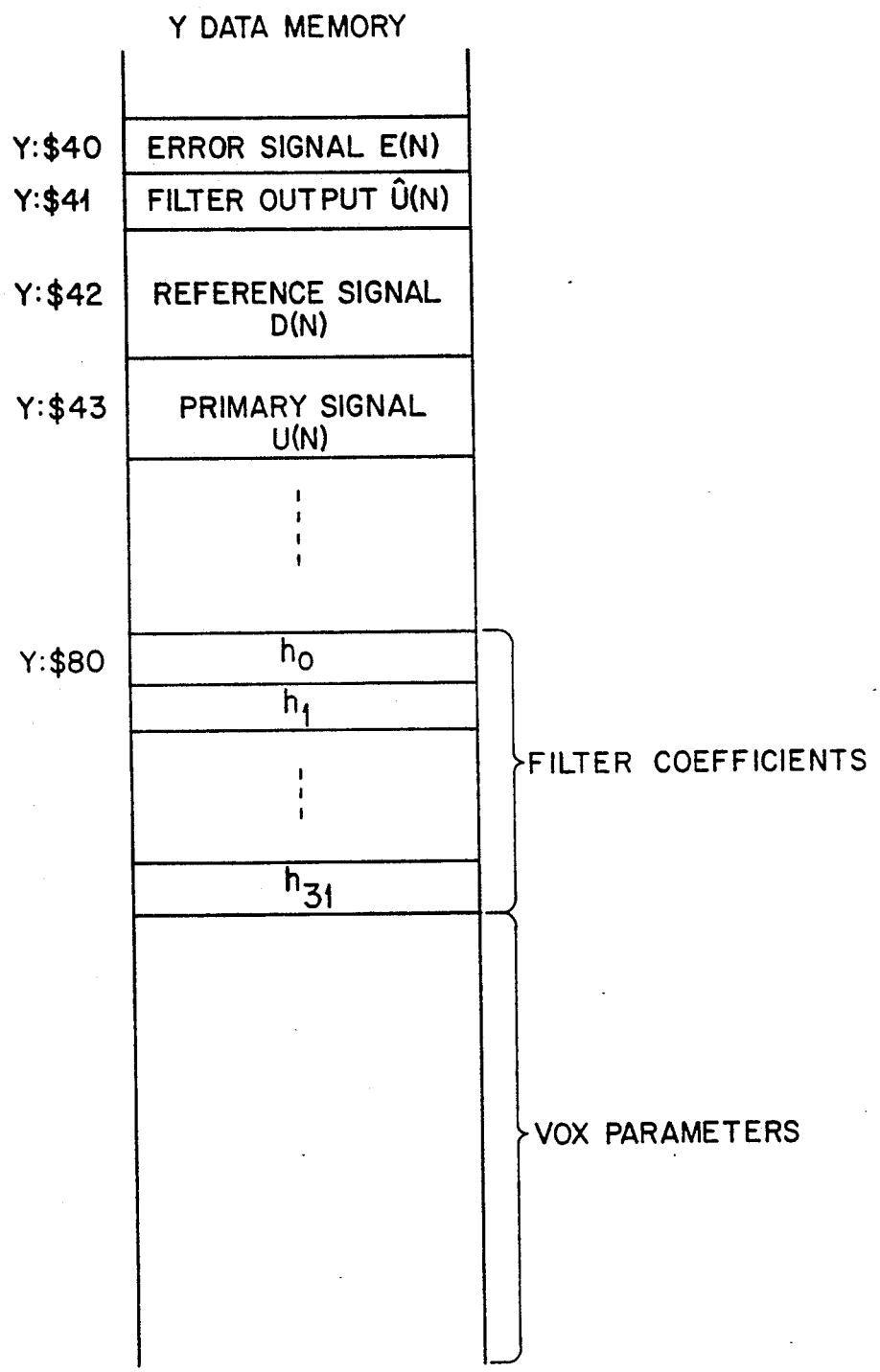
Figure 17:
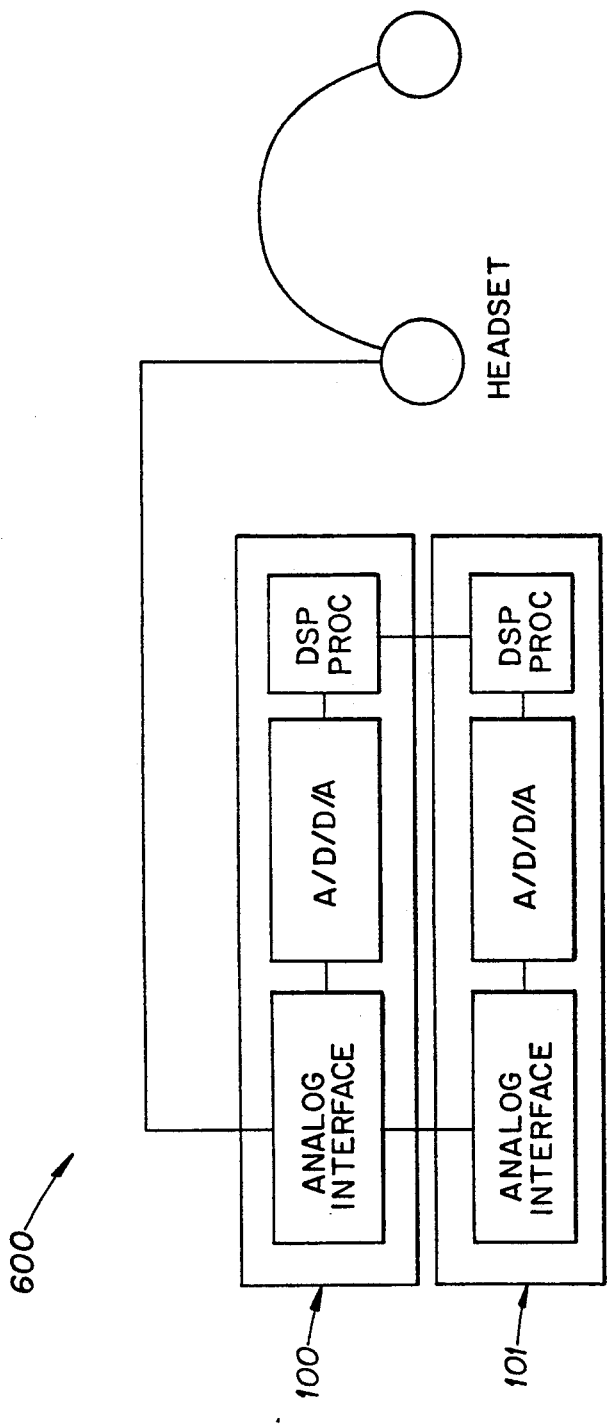
FIG. 17 illustrates an expansion unit in accordance with another embodiment of the present invention.

The present program resides in program memory locations P:$0000 to P:$03FF. A program memory map is depicted in FIGS. 12A, 12B and 12C. On Power Up ("On/Off" switched from "Off" to "On"), the DSP56001 bootstrap program is invoked, which loads the program from the external ROM into the processor. The processor then initializes all relevant data memory to its required values. When this is complete, the LMS program and VOX program are executed. The spectral subtraction algorithm may be executed on a processor like processor 212 (FIG. 13) in the expansion unit 600 (FIG. 17).

Therefore, the present apparatus for obtaining the desired noise cancellation and speech enhancement preferably includes at least three devices, which are coupled together in a cascaded manner, that is an LMS device, a spectral subtraction device, and a PTT/VOX device ("VOX device"). As previously discussed, these devices operate in accordance with stored algorithms. The LMS and spectral subtraction devices generally obtain the desired noise cancellation and speech enhancement with the VOX device providing proper performance of the ANC.

The LMS or algorithm is used due to its simplicity and robustness in adaptive filtering applications. Adaptive filters have the ability to adjust their own coefficients automatically, and their design requires little or no a priori knowledge of signal or noise characteristics. As is to be appreciated, while the preferred embodiment uses the LMS device to perform coefficient adaptation, the present invention is not so limited and any other means may be used to perform coefficient adaptation.

Figure 1:
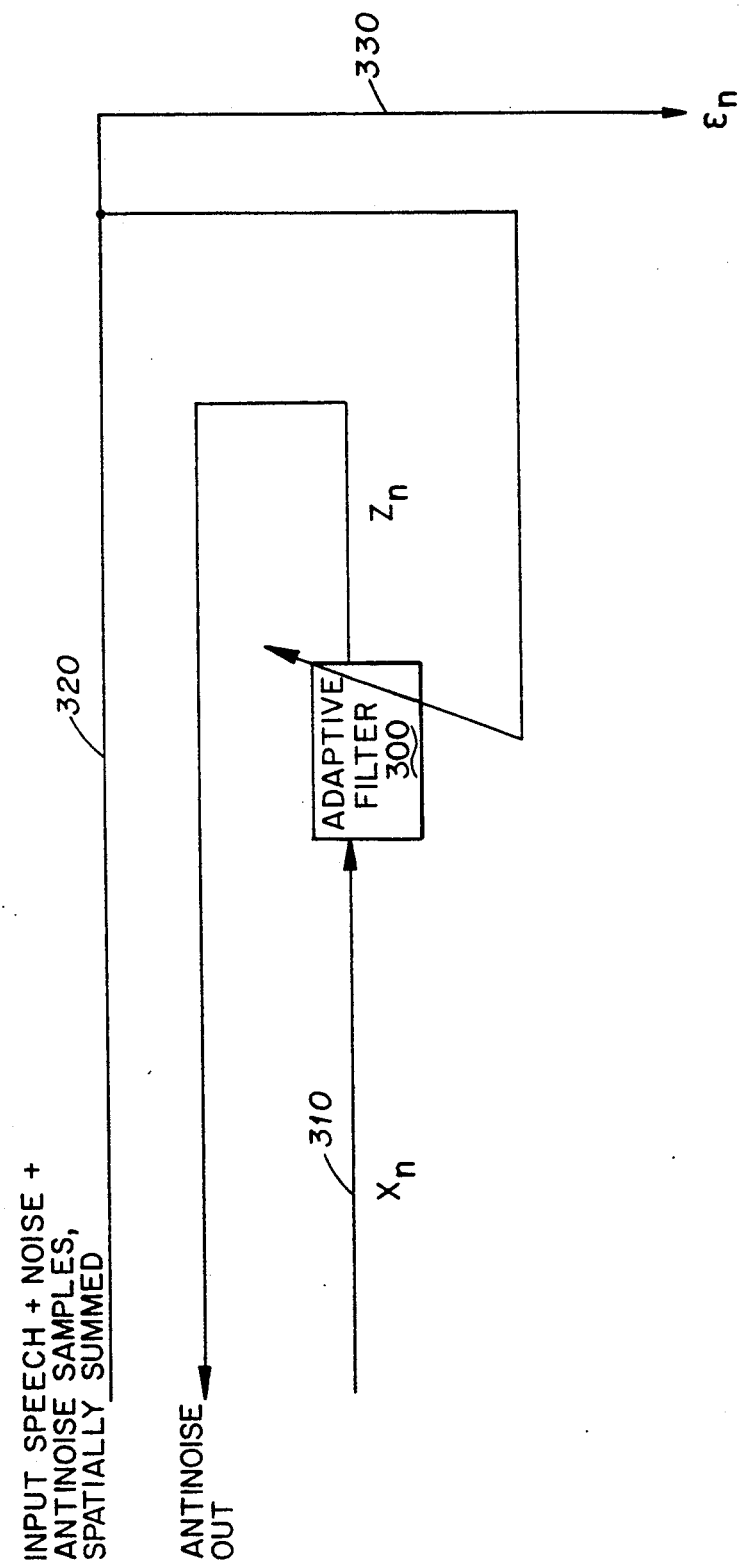
FIG. 1 illustrates a device utilizing a LMS algorithm according to an embodiment of the invention.

FIG. 1 shows a block diagram of an adaptive filter 300 used as an adaptive noise canceler (ANC). The ANC has two inputs: a primary input 310 and a reference input 320. The primary input 310 consists of a speech signal corrupted with noise. The reference input 320 consists of noise that is uncorrelated with the speech in the primary input, but is correlated to the noise in that input. The adaptive filter 300 uses the noise in the reference input 320 to estimate the noise in the primary input 310. The estimated noise is then subtracted from the primary input to produce a noise-free speech signal 330 which is also the input to the spectral subtraction device. The algorithm that is used to update the filter coefficients is preferably the normalized LMS algorithm and may be expressed by the following two equations:

$$e(n) = d(n) - \hat{d}(n) \quad (1)$$

$$wk(n+1) = (1-alpha)wk(n) + Muo \cdot e(n) \cdot u(n-k+1) / \|u(n)\| \quad (2)$$

wherein u(n) is the signal received by the primary input 310, d(n) is the signal received by the reference input 320, $\hat{d}$(n) is the filter output, wk(n) is the kth filter coefficient at time n, Muo is the step-size parameter, alpha is a predetermined coefficient for enabling the filter coefficient to adapt more quickly in non-stationary noise environments, and $\|u(n)\|$ is the norm of the input signal u(n). The norm is preferably defined as the maximum magnitude input sample of a sample history of the most recent N input samples, where N is the filter order. The adaptive transversal filter that is used preferably has an order of 32.

In the normalized LMS algorithm, instead of using a constant step-size parameter to update the filter coefficients as is done in the LMS algorithm, the step-size parameter is divided by the norm squared of the input signal. One drawback of the LMS algorithm is that the convergence rate of the algorithm decreases as the input signal level decreases. However, by dividing the step-size parameter by the norm of the input signal, the effective step-size is increased when the input signal level decreases. Although the effective larger step-size leads to a faster convergence rate, it also causes relatively larger steady-state error.

The voice operated switch (VOX) device (algorithm) is designed to determine the presence or absence of speech in a high noise environment such as a poorly specified high noise environment.

As a result, the VOX device is able to stop the coefficient adaptation when it detects speech in the reference input. This is especially useful since when a large speech signal is present in the error signal it can cause the filter coefficients to diverge from their optimal values. The digital VOX device 132 is preferably implemented in the software to detect speech when present in the reference input 310. When there is no speech the device adapts to the input noise and the filter coefficients are updated after each new received sample. When the digital VOX device detects a speech signal, the device (algorithm) stops updating the filter coefficients and uses the current filter coefficients to compute an estimate of the noise present in the reference. Especially when the noise environment does not vary significantly during the period when speech is present in the reference input 310, the performance of the device is not degraded significantly. A step-size parameter of preferably 0.095 is used with a forgetting factor of 0.999. The forgetting factor allows the VOX device to have a finite memory which is desirable when operating in a non-stationary environment.

The output of the VOX device is a binary valued variable, VUV. If VUV=1, then speech is present; otherwise if VUV=0 speech is considered absent.

The VOX device preferably buffers 196 samples of output speech from the LMS device to the spectral subtraction algorithm. Upon detecting speech, each of the samples are output, but delayed by 196 samples. This buffer value is a preferred baseline, but may be increased or decreased. The purpose of this buffer is to accurately reproduce onsets of the speech waveform.

The VOX device provides a detection probability of 0.99 down to 2 dB signal-to-noise ratio (SNR) of either speech or silence. This is preferably measured with 300 Hz sine waves in Gaussian noise. The VOX uses at least two detectors; a robust distribution-free detector to test magnitudes and a magnitude detector for the first linear prediction coefficient. The magnitude detector maps any distribution of the hypothesis into the uniform distribution and tests for deviations from the uniform distribution. This distribution detector tests for changes in the marginal distribution. The magnitude detector for the first predictor coefficient effectively tests the hypothesis of (local) stationarity against the alternative. Detection decisions are made on the basis of changes in the predictor coefficient over at least approximately 256 samples. As a baseline, the system operates on high-pass filtered speech. Parameters of the VOX device may be varied depending on the application of the adaptive noise cancellation and speech enhancement system.

Figure 2:
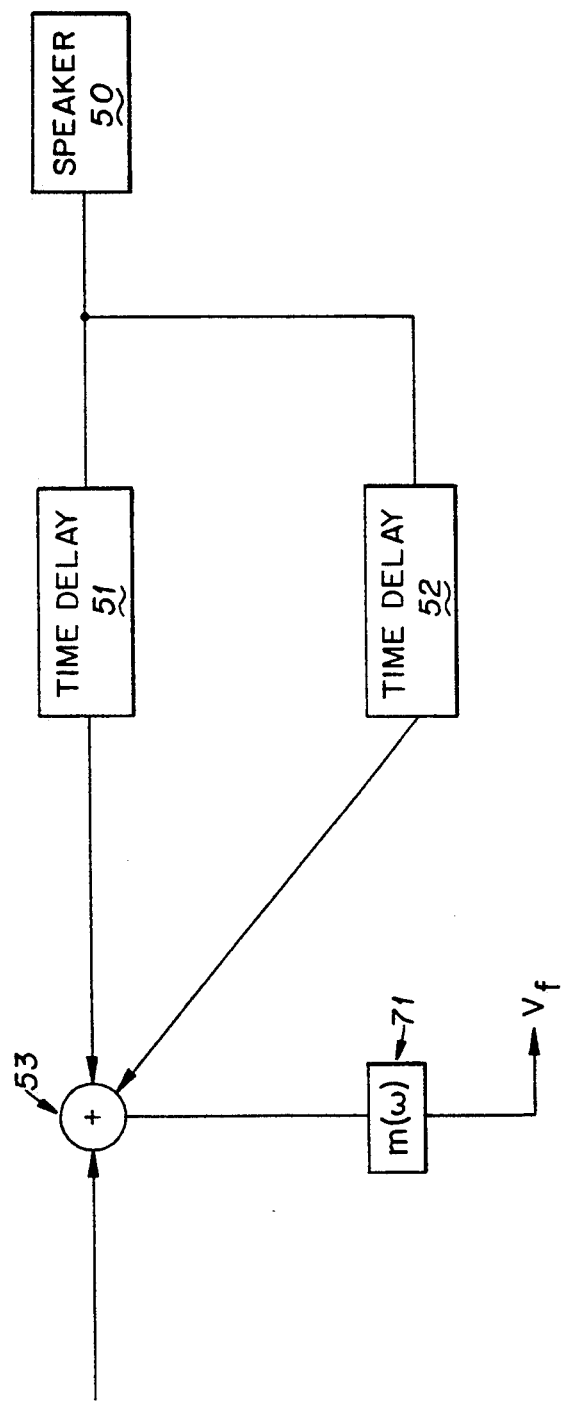
FIG. 2 illustrates a speaker, ear canal and microphone.

FIG. 2 depicts a model for the feedback microphone sensor 70, ear canal 116 and speaker 50. The model illustrated in FIG. 2 assumes that, as a result of the adaptation process, a signal is produced that is out of phase with the input. The assumption of a slight contraction of the ear volume of the ear canal will give rise to an impedance mismatch between the ear canal and the middle ear; this, combined with a closed off ear canal will cause acoustic reflections to occur. As a first approximation, this is approximated by a weighted sum of two time delay elements 51 and 52 as shown in FIG. 2. The transfer function of the system may be expressed as in equation 3:

$$\frac{V_o}{V_i} = \frac{m(\omega)}{1 + S(\omega)[e^{-j\omega T_{d1}} + \alpha e^{-j\omega T_{d2}}]} \quad (3)$$

wherein:
$V_i$ = input
$V_o$ = output at speaker
$m(\omega)$ = microphone transfer function
$S(\omega)$ = speaker transfer function
$T_{d2}$ = time delay
$T_{d2}$ = time delay, which is assumed to be approximately 0

Typically, $$\left|\frac{\omega T_{d2}}{2}\right| << \pi \text{ so that}$$

$$\frac{V_o}{V_i} \approx \frac{m(\omega)}{1 + e^{-jT_{d2}/2} S(\omega)\left[1 + \frac{\omega^2 T_{d2}^2}{4}\right]}$$

The speaker 50 and the sensor 70 can be shown to have a transfer function as represented at block 71 having a zero at the origin and two poles determined by the mechanical and electrical characterizations of the speaker (see J. White, "*Considerations in High Fidelity Moving Coil Earphone Design*", IEEE Trans. Audio, pp. 188°194 Nov.-Dec. 1963).

Thus, the compensator may include a filter with four poles and three zeroes to fully compensate for all effects. In addition, if the filter transfer function is H(ω), then |H(ω̂) S(ω̂)| >> 1 may be obtained from 0 to 10 kHz so as to insure stability of the compensator. The actual filter parameters can be set by one skilled in the art without undue experimentation.

Figure 3:
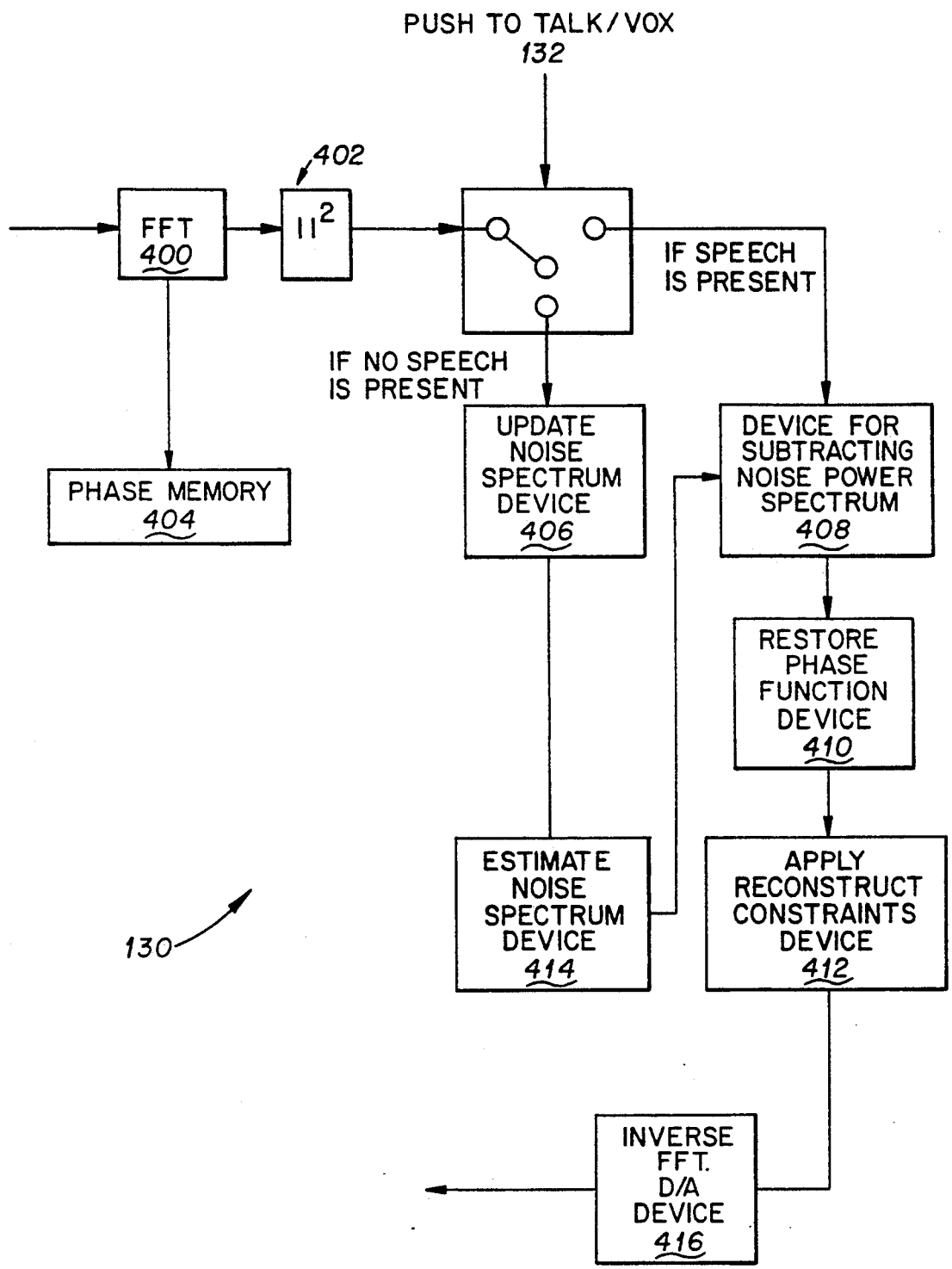
FIG. 3 illustrates a device utilizing a Spectral Subtraction Algorithm device according to an embodiment of the invention.

The spectral subtraction algorithm is preferably implemented by the processor 212 in the expansion unit 101, as previously described. FIG. 3 depicts the spectral subtraction algorithm device. Input speech samples are input into a buffer (not shown), preferably a 128 sample buffer. These speech samples are Fast Fourier Transformed (FFT'd) by FFT 400 and converted to polar form (magnitude and phase). The phase position is stored in a phase memory 404 and the magnitude portion is supplied to a magnitude squared device 402, whereupon the magnitude portion is squared and supplied to the PTT/VOX 132. When the push to talk or VOX indicates the absence of speech, the magnitude of the FFT is used to update a noise spectrum model in the device 406. The update equation is given by equation 4 below:

$$|\hat{N}(\omega)| = |\hat{N}(\omega)| (1-\xi) + \xi G |(\underline{x(\omega)}| - |\hat{\omega}(\omega)|)  \quad (4)$$

wherein $1-\xi$ is the "forgetting factor";

$|X(\omega)|$ is the input FFT magnitude;

$|\underline{N}(\omega)|$ is the noise spectrum; and G controls averaging time. The resultant is stored as an estimated noise signal in a estimate noise spectrum device 414.

Upon the detection of speech, the noise spectrum is subtracted form the speech spectrum in a device for subtracting estimated noise 408. The resultant is limited so that values more than 23 dB down are clipped to be 23 dB down. In addition, the resulting spectrum magnitude is filtered with a 5 point moving average. When this is completed, the phase function is restored in a restore phase function device 410, the signal is inverse FFT'd and converted to an analog signal in a device 416.

The coefficients for the moving average filter may be expressed as in equation 5:

$$\underline{\gamma}n = \sum_{h=-2}^{2} \hat{\omega}_h x_{n-h} \quad (5)$$

wherein:

$\underline{Y}n$ = output of the moving average filter x = FFT magnitude and, $\hat{\omega}_{-2} = \hat{\omega}_{-1} = \hat{\omega}_2 = \hat{\omega}_1 = 0.05$ $\hat{\omega}_0 = 0.8$ Additional reconstruction constraints can be applied by detecting the number and trajectory of tonals in the noise and removing them based upon predicted trajectories.

In other words, the FFT device 400 or algorithm is used to compute the sample spectra of the noise and speech signals. A push to talk or digital VOX 132 is used to determine speech from noise. The digital VOX or algorithm (code and programming provided below) preferably uses the following test statistics to determine the speech from the noise: sample zero crossings, changes in the number of tonals, energy, and a nonparametric test such as the Kolmogorov-Smirnov Test on the sample data. The Spectral Subtraction processor 130, in the absence of noise, updates a sample power spectrum of the noise. When speech is detected, the phase is computed from the spectrum, the noise spectrum estimate is subtracted from the speech spectrum, the phase function is restored, and additional reconstruction constraints based upon the number of tonals detected in the noise and the shape of the noise spectrum are used to reconstruct the speech signal with attenuated noise.

Figure 7:
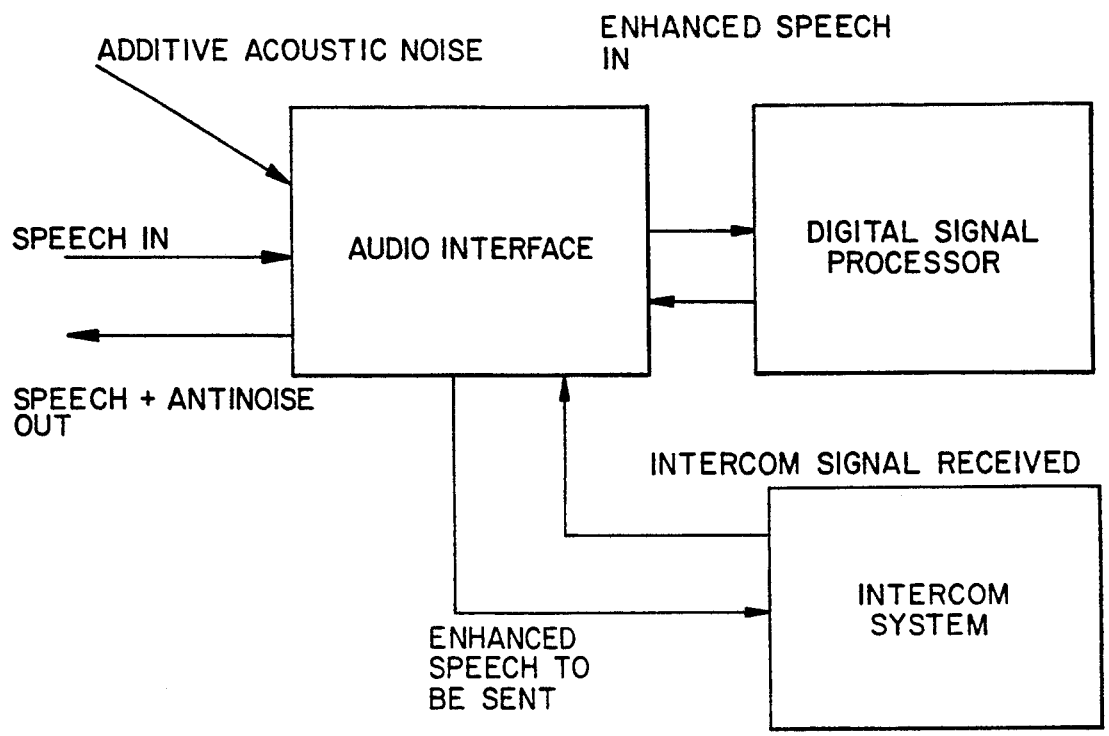
FIG. 7 illustrates an adaptive noise cancellation and speech enhancement system according to an embodiment of the invention.

FIG. 7 depicts an overall system of the present invention. As noted previously, the present invention is especially well suited for use in a high noise environment, e.g., as part of a communications system such as an intercom, telephone, etc. in any typical high noise environment. The audio interface (see, for example, FIGS. 4, 8, 9, 10) preferably includes a sensor to sense the ambient noise, a sensor to sense the signal in the ear canal, and a speaker to produce the local anti-noise and received speech, all resident in a headset, and the necessary analog signal conditioning circuitry to insure optimum quantization of the signal in the Digital Signal Processor (DSP). The Digital Signal Processor estimates the noise, and removes an estimate from the speech plus noise. The system configuration in the transmit and receive modes are illustrated in the previously described FIGS. 6 and 5, respectively.

The Adaptive Noise Canceler (ANC) unit is shown in FIG. 11. The ANC Output Volume control 120 allows the user to vary the amount of noise cancellation by varying the LMS algorithm Loop gain and by varying the Reconstruction constraints in the Spectra Subtraction Algorithm. The ANC headphones (FIGS. 4 and 8) contain an in ear sensor 70 acoustically isolated with the use of plastic tubing, the speaker 50 to play the antinoise and speech, and an external sensor 60 to sense the ambient acoustic noise. The in ear sensor 70 also acts as a microphone in the transmit mode. The entire headset is designed with a plastic cover that conforms to the ear canal, providing the acoustic conduction necessary for in ear transmission.

Figure 10:
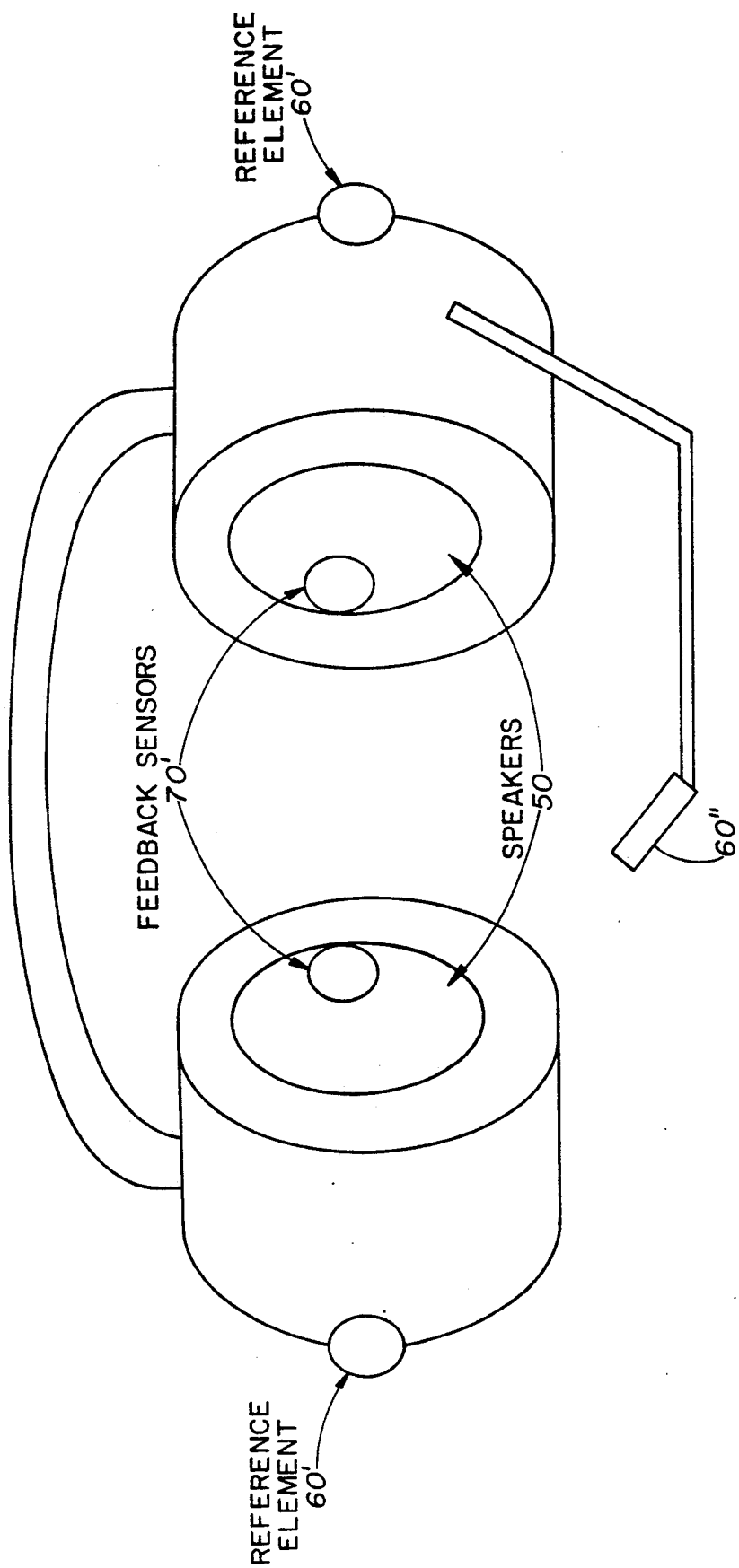
FIG. 10 illustrates a headset unit according to an embodiment of the invention having a boom mike.

An alternative headset configuration is shown in FIG. 10. In this diagram the feedback microphone 70' is not used as a transmit microphone; instead, a boom mike 60" is used. In this configuration reference sensors 60' are positioned externally, and boom microphone 60" can also be used as an additional reference sensor by using standard dual diaphragm noise canceling elements. This configuration allows the user to have an "over the ear" fit instead of "in the ear" if desired.

Figure 9:
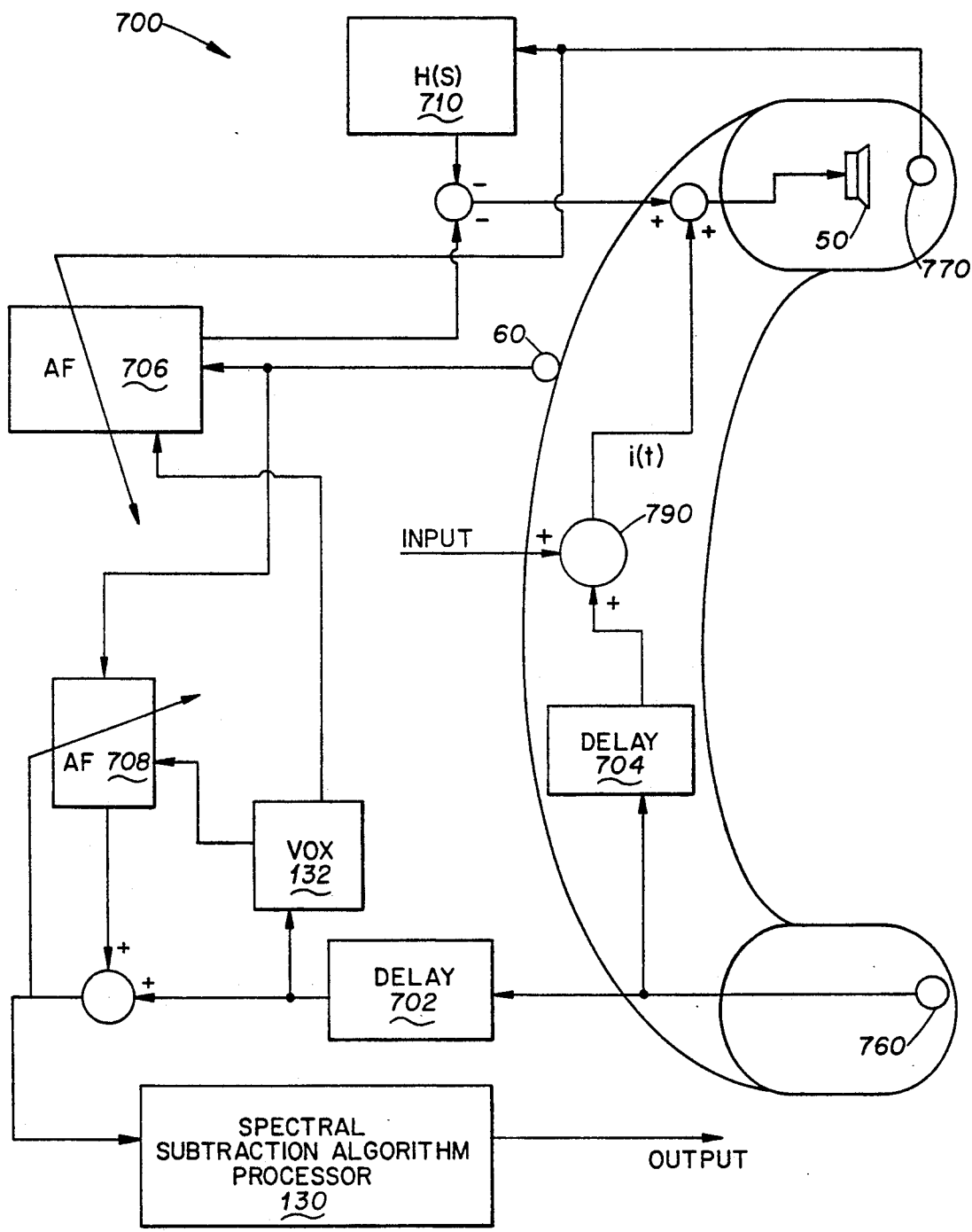
FIG. 9 illustrates a telephone headset system according to an embodiment of the invention.

A third headset configuration 700, to be used in telephone applications is presented in FIG. 9. The assumptions of the noise field insure that the signal i(t) will be statistically independent of the noise signal N(t). This fact allows the adaptive filter AF 706 to cancel noise at the input to a linear filter H(s) 710, which is highly correlated with the signal from the microphone 60. Microphone 60 can be configured to incorporate noise canceling 2-element microphones wired to subtract common mode signals that might arise from vibration, speech transduced from the headset casing, etc.

The linear filter H(s) 710 acts as a compensator for the responses of the speaker 50 transfer function S(s). Ideally, it would have a transfer function C/S(s); C is a constant chosen so that |S(s)M(s)H(s)| >> 1. An adaptive filter AF 708 is provided to account for the fact that the noise field at the output of a microphone or sensor 760 may be decorrelated from the noise present at the microphone 770 and to account for the fact AF 706 cancels a signal that will be sent through speaker 50. The delays caused by delays 702 and 704 are added to account for the fact that the signal present at microphone 706 will, in general, be decorrelated from the signal at microphone 60. As before, the output of AF 708 is sent to a Spectral Subtraction algorithm processor 130 for further speech enhancement; and, the VOX 132 is employed in this embodiment as described above.

FIG. 17 illustrates the adaptive noise cancellation unit 100 and the expansion unit 101. As previously mentioned, the architecture of the expansion unit is substantially similar to that shown in FIG. 13.

Figure 15:
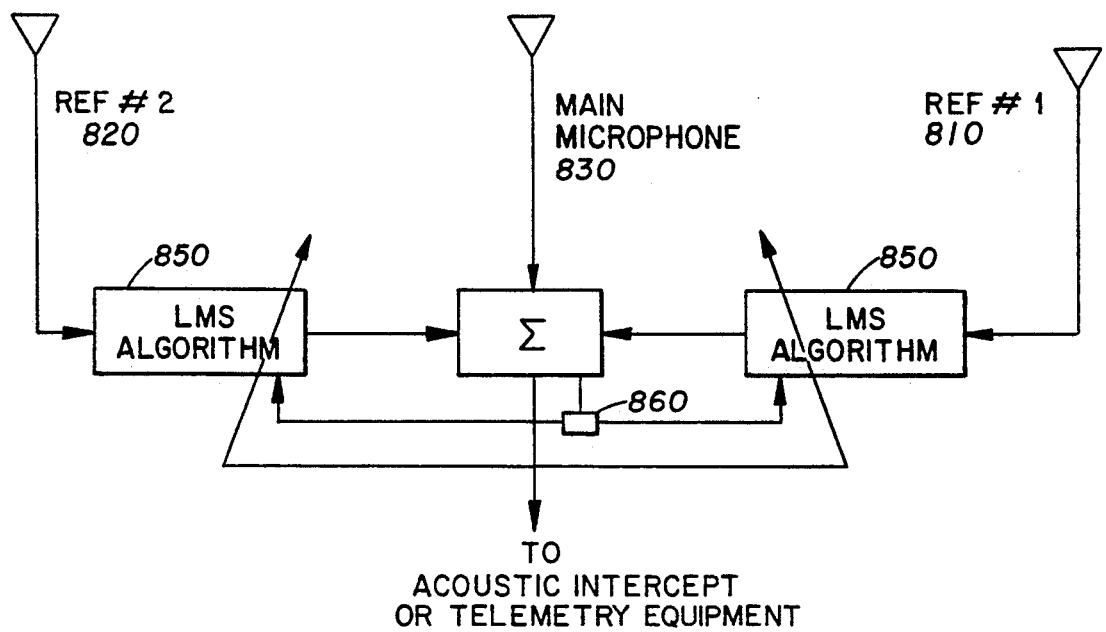
FIG. 15 illustrates an adaptive microphone in block diagram form for use with the system of the invention.
Figure 16:
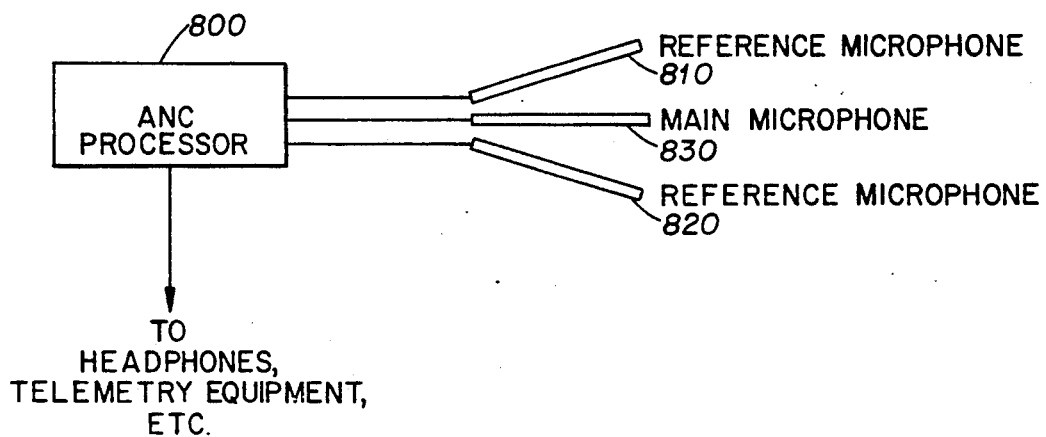
FIG. 16 further illustrates the microphone of FIG. 15.

An additional application of the ANC unit is in the area of ambient noise cancellation for microphones in acoustic surveillance or telemetry. Because of the finite acoustic aperture, even directional microphones will have sidelobes in their spatial response patterns. Interference coming into the sidelobe of a conventional microphone can degrade the signal to a noise ratio and/or reception range of acoustic receivers. An ANC unit 800 (FIG. 16) can be applied to the problem by using two additional reference microphones 810 and 820 with peak spatial responses at the 3 dB points of a main microphone 830. In FIG. 16, the main microphone is used to retrieve the desired signal; reference microphones 810 and 820 are used to adaptively filter any unwanted signals in the sidelobes. FIG. 15 depicts a block diagram of how the microphones are connected to adaptive filters 850 and summed.

As before, the VOX algorithm or signal detection means 860 freezes weights when speech is detected in the main microphone. For telemetry applications, the signal detection means 860 can be a match filter/envelope detector/thresholding device or modem output may be used to produce a decision to freeze the weights.

This microphone configuration as in FIG. 16 is useful for acoustic surveillance, acoustic data transmission and motion sensing.

Having herein described in detail preferred embodiments of the present invention, it is to be understood that the invention defined by the appended claims is not to be limited to particular details set forth in this description as many apparent variations thereof are possible without departing from the spirit or scope of the present invention.

The following Appendix lists the VOX algorithm.

APPENDIX

Pseudocode

Table of Variables for VOX Algorithm

| Variable | Initial (Power Up) Value | Definition |
| --- | --- | --- |
| VUV | 0 | =1 if Speech present<br>=0 otherwise |
| stchng | 1 | =1 if voicing state "just changed"<br>=0 otherwise |
| count | 0 | sample counter |
| x | - | current "desired signal" input |
| z | - | high pass filtered, magnitude of speech |

| | | |
|---|---|---|
| quant(4) | 0 | sample quantiles of z under hypothesis |
| qup(4) | 0 | recursively updated quantiles if no voicing state change |
| array(4) | 0 | storage of 4 speech samples for initial quantile estimate |
| gamma | 0.00001 | 1-Forgetting factor for exponential averager |
| G | 100 | Gain Factor for Exponential Averager |
| u(t) | - | unit step function |
| test_count | 0 | counter |
| tstat | 0 | test statistic of marginal d.f. |
| Tspeech | 0.05 | threshold for speech detection |
| Tnoise | 10.00 | Threshold for "non speech" detection |

| | | |
|---|---|---|
| wf0 | 0 | predictor coeff. (p.c.) est. |
| wf1...wf3 | 0..0 | previous p.c. estimates |
| ef | 0 | error for predictor estimator |
| tpc | 0 | variable for p.c. test |
| Thresh_pc | tbd | p.c. test threshold |
| count_pc | 0 | p.c. sample counter |
| xm1 | 0 | previous x value |

Vox Algorithm

1. High Pass filter speech w/ 1rst Order IIR filter, fp=800Hz.
2. Take magnitude of filter output (call "z")
; Note "return" implies resume normal operation of program
; without any additional state change.
3.
```
    if(stchng=1) then
        stchng=0
        test_count=0
        count=0
        test=0
        tstat=0
        count_pc=0
    end if
```

```
                count_pc=count_pc+1 ef-x-wf0*xm1 xm1=x wf0=(1-ap)wf0+g(ap)*ef*x if(count_pc=128) then count_pc=0 wf3=wf2 wf2=wf1 wf1=wf0 wf0=0 if(test=1) goto prep_test
         count=count+1
         if(count>132) count=133
         if(count=<4) then
                array(count)=z
                if(count<4) return
                else
                Rank array & store result in quant
        end if
        end if do q=1,4
                quant(q)=(1-gamma)*quant(q)
                        +(G*gamma)*u(z-quant(q)) -q*.2)
                qup(q)=quant(q)
                end do if(count=132) then
                test=1
                return
                end if
```

```
; Have enough samples to test at this point prep_test       test_count=test_count+1 do q=1,4 tstat=tstat+u(quant(q)-z)

qup(q)=(1-gamma)*qup(q)

+(G*gamma)*u(z-qup(q)) -q*.2)

end do if(test_count=128) then test_count=0

;       with 128 samples we test if(VUV=0) then if(tstat<Tspeech) then goto pc_test else ; update quantile estimate do q=1,4 quant(q)=.75*quant(q)+.25*qup(q)

end do return end if else

; check for speech end if(tstat>Tnoise) then goto pc_test else if(8 or more seconds elapsed since speech onset set to noise only)

else

; update quantile estimate do q=1,4
```

```
            quant(q)=.75*quant(q)+.25*qup(q)

end do return end if end if end if pc_test tpc=abs(wf1-wf3)

wf0=0 if(tpc> Thresh_pc) then stchng=1

VUV=.not.(VUV)    ; logical "NOT" function return end
```

(END OF VOX ALGORITHM)

REFERENCES

1. B. Widrow et al., "Adaptive Noise Canceling: Principles and Applications", Proc. IEEE, Vol. 63, pp. 1692–1716, Dec. 1975.
2. B. Widrow et al., "Adaptive Antenna Systems", Proc. IEEE, Vol. 55, No. 12, Dec. 1967.
3. M. Sambur, "Adaptive Noise Canceling for Speech Signals", IEEE Trans. Acoust. Speech, and Sig. Proc., Vol. ASSP-26, No. 5, Oct. 1978.
4. K. Ogata, *Modern Control Engineering*, Prentice Hall, 1968.
5. B. Kuo, *Automatic Control Systems*, Prentice Hall, 1965.
6. A. Papoulis, *Probability, Random Variables and Stochastic Processes*, 2nd Ed. McGraw Hill, 1985.
7. D. Luenberger, *Optimization by Vector Space Methods*, McGraw Hill, 1969.
8. S. Boll, "Suppression of Acoustic Noise in Speech Using Spectral Subtraction", IEEE Trans. on Acoust., Speech, and Sig. Proc., Vol. ASSP-27, pp. 113–120, April 1979.
9. L. Rabiner et al., "A Comparative Performance Study of Several Pitch Detection Algorithms", IEEE Trans. on Acoust., Speech, and Sig. Proc., Vol. ASSP-24, pp. 339–418, 1976.
10. D. Youla et al., "Image Restoration by the Method of Convex Projections: Part 1—Theory", IEEE Trans. on Medical Imag., Vol. MI-1 No. 2, October 1982.
11. Zinser, Jr. et al., U.S. Pat. No. 4,649,505, Mar. 10, 1987 ("Zinser").
12. Borth et al., U.S. Pat. No. 4,530,304, Dec. 16, 1986 ("Borth").
13. Cantrell, U.S. Pat. No. 4,736,432, Apr. 5, 1988.
14. Landgarten et al., U.S. Pat. No. 4,862,506, Aug. 29, 1989 ("Landgarten").
15. Zeigler, Jr., U.S. Pat. No. 4,878,188, Oct. 31, 1989 ("Zeigler 188").
16. Elliot et al., U.S. Pat. No. 4,947,356, Aug. 7, 1990 ("Elliot").
17. Stettiner et al., U.S. Pat. No. 4,959,865, Sep. 25, 1990 ("Stettiner").
18. Ziegler, Jr., U.S. Pat. No. 4,977,600, Dec. 11, 1990 ("Zeigler 600").
19. Langberg, U.S. Pat. No. 4,985,925, Jan. 15, 1991 ("Langberg").
20. Nagayasu, U.S. Pat. No. 5,029,218, Jul. 2, 1991.
21. Hill, U.S. Pat. No. 5,010,576, Apr. 23, 1991.
22. Sasaki et al., U.S. Pat. No. 5,091,954, Feb. 24, 1992 ("Sasaki").
23. Takahashi et al., U.S. Pat. No. 5,018,202, May 21, 1991.
24. Chance, Jr., U.S. Pat. No. 4,241,805, Dec. 30, 1980.
25. Grossman, U.S. Pat. No. 5,052,510, Oct. 1, 1991.
26. Gallagher, U.S. Pat. No. 4,261,708, Apr. 14, 1981.
27. Fowler, Jr. et al., U.S. Pat. No. 3,702,644.

What is claimed is:

1. Headset apparatus to be worn by an operator for use in a adaptive signal processing system having first processing means for adaptively processing reference signals supplied thereto so as to form a first processed signal, means for combining the first processed signals and an exterior signal supplied from a microphone used by another operator so as to form an input signal, determining means for determining if a received signal represents speech originating from the operator wearing said headset apparatus and including switch means for supplying the speech signal therefrom if the determination indicates that said received signal represents said speech, and second processing means receiving said speech signal from said switch means for adaptively processing the same so as to remove residual broadband components in said speech signal for supply to another of said operators, said apparatus comprising at least one housing each having first microphone means receiving a reference acoustic signal for producing a reference signal for supply to said first processing means, speaker means receiving said input signal for producing audible information to the operator wearing said headset apparatus, and second microphone means receiving an acoustic sound from within the housing for producing a signal for supply to said determining means.

2. An audio communication system for communication between two or more operators, said system comprising:
   headset means worn by one of the operators including at least one housing each having first microphone means for producing a reference signal, second microphone means receiving an acoustic sound from within the housing for producing an internal signal therefrom and speaker means for receiving an input signal to provide audible information to the operator using said headset means;
   first processing means for adaptively processing the reference signal received from the first microphone means so as to form a first processed signal;
   means for combining the first processed signals from the headset means worn by the operator and an exterior signal supplied from a microphone used by another of said operators so as to form said input signal for said speaker means;
   determining means receiving said internal signal from the second microphone means for determining if said internal signal represents speech originating from the operator wearing said headset means, said determining means including switch means for supplying the internal signal therefrom if the determination indicates that said internal signal represents said speech; and
   second processing means receiving said speech signal from said switch means for adaptively processing the same so as to remove residual broadband components in said speech signal for supply to another of said operators.

3. An audio communication system for communicating between two or more operators according to claim 2, in which said switch means includes a voice operated switch.

4. An audio communication system for communicating between two or more operators according to claim 2, in which said determining means determines if said internal signal represents said speech by utilizing statistics relating to at least one predetermined factor.

5. An audio communication system for communicating between two or more operators according to claim 4, in which said statistics relate to at least one of number of sample zero crossings, changes in number of tonals, energy level and a predetermined nonparametric factor.

6. An audio communication system for communicating between two or more operators according to claim 2, in which said speech which is received by said second microphone means is an acoustic signal supplied through an eustachian tube contained within said operator using said headset means which is generated when the same operator speaks.

7. An audio communication system for communicating between two or more operators according to claim 2, further comprising means for supplying said internal signal from the second microphone means to said first processing means.

8. Headset apparatus to be worn by a first operator for use in an audio communication system for communicating between two or more operators having determining means for determining if a received signal represents speech from said first operator and for supplying a signal so indicating therefrom, first processing means for adaptively processing said received signal so as to obtain a first processed signal, and second processing means for adaptively processing said first processed signal so as to remove residual broadband components in the speech signal from said first operator for supply to another of said operators, said apparatus comprising a housing having speaker means for providing audible information to said first operator using said headset apparatus, first microphone means receiving an acoustic signal from said first operator using said headset apparatus for producing an output signal for supply to said determining means and said first processing means, second microphone means for producing a reference signal for supply to said first processing means, third microphone means for receiving said audible information for supply to said first processing means, delay means for delaying said output signal from said first microphone means so as to form a delayed signal, and means for receiving an input signal supplied from a microphone used by another operator and for combining the same with said delayed signal for supply to said speaker means.

9. An audio communication system for communicating between two or more operators, said system comprising:
   headset means used by one of the operators including a housing having speaker means for providing audible information to said one operator using said headset means, first microphone means for receiving an acoustic signal from said one operator using said headset means, second microphone means for producing an external reference signal, third microphone means for receiving said audible information, and means for receiving an input acoustic signal from another of said operators and for combining the same with said acoustic signal from said one operator for supply to said speaker means;
   determining means receiving an output signal from said first microphone means for determining if said output signal represents speech from said one operator and for supplying a signal so indicating therefrom;
   first processing means receiving respective output signals from said determining means and said first, second and third microphone means for adaptively processing the same so as to obtain a first processed signal; and second processing means for adaptively processing said first processed signal so as to remove residual broadband components in the speech signal from said one operator for supply to another of said operators.

10. An audio communication system for communicating between two or more operators according to claim 9, further comprising first delay means for delaying the output signal from said first microphone means by a first predetermined amount prior to supply to said determining means.

11. An audio communication system for communicating between two or more operators according to claim 10, in which said headset means further includes second delay means for delaying said output signal from said first microphone means by a second predetermined amount prior to supply to said means for receiving said input acoustic signal.

12. An audio communication system for communicating between two or more operators according to claim 9, in which said first processing means includes an adaptive filter.

13. An audio communication system for communicating between two or more operators according to claim 12, in which said first processing means further includes linear filter means for receiving the output signal from said third microphone means.

14. An audio communication system for communicating between two or more operators, said system comprising:

a plurality of headset means each to be worn by a respective operator, each headset means including a housing having speaker means for providing audible information to the operator using the headset means, first microphone means for receiving an acoustic signal from said operator using the headset means, second microphone means for producing an external reference signal, third microphone means for receiving said audible information, and means for receiving an input acoustic signal from another of said operators and for combining the same with said acoustic signal from said operator using the respective headset means for supply to said speaker means;

determining means receiving an output signal from said first microphone means for determining if said output signal represents speech from said operator using the headset means and for supplying a signal so indicating therefrom;

first processing means receiving each respective output signals from said determining means and said first, second and third microphone means for adaptively processing the same so as to obtain a first processed signal; and second processing means for adaptively processing said first processed signal so as to remove residual broadband components in the speech signal from said operator using the headset means for supply to the other said operator or operators.

15. An audio communication system for communicating between two or more operators according to claim 14, further comprising first delay means for delaying the output signal from said first microphone means of each of said headset means by a first predetermined amount prior to supply to said determining means.

16. An audio communication system for communicating between two or more operators according to claim 15, in which each of said headset means further includes second delay means for delaying said output signal from the respective first microphone means by a second predetermined amount prior to supply to the respective means for receiving said input acoustic signal.

17. An audio communication system for communicating between two or more operators according to claim 14, in which said first processing means includes an adaptive filter.

18. An audio communication system for communicating between two or more operators according to claim 17, in which said first processing means further includes linear filter means for receiving the output signal from said third microphone means.

19. An adaptive acoustic receiver apparatus comprising:

first microphone means for receiving an acoustic signal and for supplying a first signal therefrom;

second microphone means for receiving a first reference acoustic signal and for supplying a first reference signal therefrom;

third microphone means for receiving a second reference acoustic signal and for supplying a second reference signal therefrom;

first processing means for adaptively processing said first reference signal so as to form a first processed signal;

second processing means for adaptively processing said second reference signal so as to form a second processed signal;

means for determining a noise signal in accordance with said first and second processed signal and for subtracting said noise signal from said first signal;

means for determining if an output signal from said means for determining and subtracting represents desired data and for supplying a signal so indicating therefrom.

* * * * *